(12) United States Patent
Iwahashi et al.

(10) Patent No.: US 12,480,201 B2
(45) Date of Patent: Nov. 25, 2025

(54) BARRIER FILM, LAMINATE, AND PACKAGING PRODUCT

(71) Applicant: DAI NIPPON PRINTING CO., LTD., Tokyo (JP)

(72) Inventors: Hiroyuki Iwahashi, Tokyo (JP); Masahiro Takahashi, Tokyo (JP); Yoshihiro Kishimoto, Tokyo (JP); Takahumi Shibata, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 67 days.

(21) Appl. No.: 17/596,467

(22) PCT Filed: Jun. 11, 2020

(86) PCT No.: PCT/JP2020/023006
§ 371 (c)(1),
(2) Date: Dec. 10, 2021

(87) PCT Pub. No.: WO2020/250969
PCT Pub. Date: Dec. 17, 2020

(65) Prior Publication Data
US 2022/0162740 A1    May 26, 2022

(30) Foreign Application Priority Data
Jun. 12, 2019    (JP) .................. 2019-109820

(51) Int. Cl.
*C23C 14/08* (2006.01)
*B32B 27/16* (2006.01)
(Continued)

(52) U.S. Cl.
CPC ............ *C23C 14/081* (2013.01); *B65D 65/42* (2013.01); *C08J 7/048* (2020.01); *C08J 7/06* (2013.01);
(Continued)

(58) Field of Classification Search
None
See application file for complete search history.

(56) References Cited

U.S. PATENT DOCUMENTS

| 12,060,207 B2 * | 8/2024 | Kishimoto | B65D 65/40 |
| 2004/0166322 A1 * | 8/2004 | Suzuki | C04B 35/10 |
| | | | 428/411.1 |

(Continued)

FOREIGN PATENT DOCUMENTS

| EP | 2799589 | 11/2014 |
| EP | 3769956 | 1/2021 |

(Continued)

OTHER PUBLICATIONS

International Search Report, issued in the corresponding PCT application No. PCT/JP2020/023006, dated Sep. 1, 2020, 6 pages.

(Continued)

*Primary Examiner* — Vivian Chen
(74) *Attorney, Agent, or Firm* — HSML P.C.

(57) ABSTRACT

[Object] To improve the adhesion of a vapor-deposited film to a substrate.
[Solution] A barrier film includes a substrate containing polyester and a vapor-deposited film containing aluminum oxide. At least the elemental bond of Al2O3 and the elemental bond of CN are detected by etching the barrier film using time-of-flight secondary ion mass spectrometry from a side adjacent to the vapor-deposited film. The peak intensity of the peak of the elemental bond of CN detected at the interface between the substrate and the vapor-deposited film is 0.15 or more times the maximum intensity value of the elemental bond of Al2O3.

12 Claims, 17 Drawing Sheets

(51) Int. Cl.

| | | |
|---|---|---|
| *B32B 27/36* | (2006.01) | |
| *B65D 65/42* | (2006.01) | |
| *C08J 7/048* | (2020.01) | |
| *C08J 7/06* | (2006.01) | |
| *C23C 14/24* | (2006.01) | |
| *C23C 14/58* | (2006.01) | |

(52) U.S. Cl.
CPC .............. *C23C 14/24* (2013.01); *C23C 14/58* (2013.01); *B32B 27/16* (2013.01); *B32B 27/36* (2013.01); *B32B 2255/20* (2013.01); *B32B 2255/26* (2013.01); *B32B 2255/28* (2013.01); *B32B 2307/7244* (2013.01); *B32B 2307/7246* (2013.01); *B32B 2439/46* (2013.01); *B32B 2439/70* (2013.01); *C08J 2367/00* (2013.01); *C08J 2367/02* (2013.01)

(56) References Cited

U.S. PATENT DOCUMENTS

| | | | | |
|---|---|---|---|---|
| 2014/0311409 | A1* | 10/2014 | Asuma | C23C 16/545 |
| | | | | 118/718 |
| 2015/0275349 | A1* | 10/2015 | Matsui | B32B 7/12 |
| | | | | 428/200 |
| 2020/0407136 | A1* | 12/2020 | Kishimoto | C08J 7/0427 |
| 2021/0002050 | A1* | 1/2021 | Kishimoto | B32B 27/36 |

FOREIGN PATENT DOCUMENTS

| | | |
|---|---|---|
| JP | 07-233463 | 9/1995 |
| JP | 2013-142161 | 7/2013 |
| JP | 2017-177343 | 10/2017 |
| JP | 2020-075480 | 5/2020 |
| JP | 2021-041697 A * | 3/2021 |
| WO | 2003/009998 | 2/2003 |
| WO | 2014/050951 | 4/2014 |
| WO | 2018/062329 | 4/2018 |
| WO | 2019/087960 | 5/2019 |
| WO | WO 2021/045127 A * | 3/2021 |
| WO | WO 2021/054123 A * | 3/2021 |

OTHER PUBLICATIONS

Extended European Search Report, issued in the corresponding European patent application No. 20822201.8, dated May 23, 2023, 9 pages.

Bodino et al., "Alumina coating on polyethylene terephthalate", Thin Solid Films, Elsevier, vol. 241, No. 1-2, Apr. 1, 1994, pp. 21-24.

Database WPI Week 201938 2019 Thomson Scientific, London, GB; AN 2019-40511 U XP002809276, 3 pages.

Database WPI Week 201827 2018 Thomson Scientific, London, GB; AN 2018-26037M XP002809277, 5 pages.

International Preliminary Report on Patentability, issued in the corresponding PCT application No. PCT/JP2020/023006, dated Dec. 14, 2021, 9 pages.

* cited by examiner

| | Sample | | | Measurement result by time-of-flight secondary ion mass spectrometry | | |
|---|---|---|---|---|---|---|
| | Structure of barrier film | Thickness of vapor-deposited film [nm] | Sample No. | Maximum value H₂ of elemental bond of Al2O3 | Peak intensity H₁ of elemental bond of CN | Peak intensity H₁/ maximum value H₂ |
| Example 1 | Substrate/ vapor-deposited film | 13 | n1 | 1097 | 523 | 0.48 |
| | | | n2 | 1102 | 508 | 0.46 |
| Example 2 | Substrate/ vapor-deposited film | 19 | n1 | 1017 | 260 | 0.26 |
| | | | n2 | 972 | 303 | 0.31 |
| Example 3 | Substrate/ vapor-deposited film/ barrier coating layer | 13 | n1 | 830 | 126 | 0.15 |
| | | | n2 | 859 | 141 | 0.16 |
| Example 4 | Substrate/ vapor-deposited film/ barrier coating layer | 19 | n1 | 824 | 127 | 0.15 |
| | | | n2 | 822 | 147 | 0.18 |
| Comparative example 1 | Substrate/ vapor-deposited film | 13 | n1 | 919 | 119 | 0.13 |
| | | | n2 | 935 | 125 | 0.13 |
| Comparative example 2 | Substrate/ vapor-deposited film | 10 | n1 | 917 | 52 | 0.06 |
| | | | n2 | 901 | 49 | 0.05 |

FIG. 24

| | Characteristics | | |
|---|---|---|---|
| | Oxygen transmission rate $[cm^3/(m^2 \cdot day)]$ | Water vapor transmission rate $[g/(m^2 \cdot day)]$ | Water-wet peel strength $[N/15mm]$ |
| Example 1 | 0.8 | 0.6 | >2.0 |
| Example 2 | 0.6 | 0.5 | >2.0 |
| Example 3 | <0.1 | 0.2 | >2.0 |
| Example 4 | <0.1 | 0.1 | >2.0 |
| Comparative example 1 | 1.0 | 1.2 | 0.8 |
| Comparative example 2 | 1.4 | 1.1 | 0.1 |

FIG. 25

| | Drum-applied voltage [V] | Oxygen transmission rate [cm³/(m²·day)] | Water-wet peel strength [N/15mm] | Appearance | Sample No. | Measurement result by time-of-flight secondary ion mass spectrometry Peak intensity H⁻/ maximum value $H_2$ |
|---|---|---|---|---|---|---|
| Example 1 | 720 | 0.8 | >2.0 | no discoloration of substrate | n1 | 0.48 |
| | | | | | n2 | 0.46 |
| Example 5 | 600 | 0.63 | 4.6 | no discoloration of substrate | n1 | 0.46 |
| | | | | | n2 | 0.46 |
| Comparative example 3 | 472 | 1.4 | 0.2 | no discoloration of substrate | --- | 0.13 |
| Reference example 1 | 530 | 1.1 | 1.6 | no discoloration of substrate | --- | --- |
| Reference example 2 | 662 | 0.8 | 2.3 | no discoloration of substrate | --- | --- |
| Reference example 3 | 895 | 1 | 0.5 | browning of substrate inappropriate as product | --- | --- |

FIG. 26

BARRIER FILM, LAMINATE, AND PACKAGING PRODUCT

TECHNICAL FIELD

The present invention relates to a barrier film, a laminate, and a packaging product.

BACKGROUND ART

Laminated films having films deposited on substrates of long films or sheets composed of plastic or other materials have been used in various applications. For example, barrier films have been developed in which vapor-deposited films formed of thin films composed of, for example, aluminum oxide are provided on substrates including plastic films. Barrier films are provided with vapor-deposited films and thus have barrier functions against oxygen and water vapor.

As a method for producing such a barrier film, for example, a method disclosed in Patent Literature 1 is known. In the method disclosed in Patent Literature 1, in the case of forming an aluminum oxide film on a surface of a substrate by a vapor deposition method, the substrate is subjected to surface treatment with, for example, plasma, and then the aluminum oxide film is formed on the surface-treated substrate.

CITATION LIST

Patent Literature

PTL 1: Japanese Unexamined Patent Application Publication No. 2017-177343

SUMMARY OF INVENTION

Technical Problem

It is an object of the present invention to provide a barrier film with improved adhesion of a vapor-deposited film to a substrate.

Solution to Problem

The present invention provides a barrier film including a substrate containing polyester, and a vapor-deposited film containing aluminum oxide, in which at least the elemental bond of $Al2O3$ and the elemental bond of CN are detected by etching the barrier film using time-of-flight secondary ion mass spectrometry from a side adjacent to the vapor-deposited film, and the peak intensity of the peak of the elemental bond of CN detected at the interface between the substrate and the vapor-deposited film is 0.15 or more times the maximum intensity value of the elemental bond of $Al2O3$.

The barrier film according to the present invention may further include a gas barrier coating film located on a surface of the vapor-deposited film.

In the barrier film according to the present invention, the peak intensity of the peak of the elemental bond of CN detected at the interface between the substrate and the vapor-deposited film may be 0.20 or less times the maximum intensity value of the elemental bond of $Al2O3$.

In the barrier film according to the present invention, the vapor-deposited film may be located at a surface of the barrier film, and the peak intensity of the peak of the elemental bond of CN detected at the interface between the substrate and the vapor-deposited film may be 0.30 or more times the maximum intensity value of the elemental bond of $Al2O3$.

The present invention provides a laminate including the barrier film described above and a sealant layer.

The present invention provides a packaging product including the laminate described above.

Advantageous Effects of Invention

According to the present invention, the adhesion of the vapor-deposited film to the substrate can be improved.

BRIEF DESCRIPTION OF DRAWINGS

FIG. 24 illustrates the evaluation results of Examples 1 to 4 and Comparative examples 1 and 2.

FIG. 25 illustrates the evaluation results of Examples 1 to 4 and Comparative examples 1 and 2.

FIG. 26 illustrates the evaluation results of Examples 1 and 5, Comparative example 3, and Reference examples 1 to 3.

DESCRIPTION OF EMBODIMENTS

Figure 1:
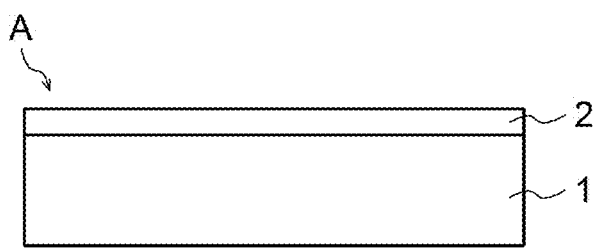
FIG. 1 is a sectional view of an example of a barrier film including a vapor-deposited film.

Embodiments of the present invention will be described below with reference to the drawings. In the drawings attached to the present specification, scales, longitudinal and lateral dimensional ratios, and the like are appropriately changed and exaggerated from those of actual products for convenience of illustration and understanding.

Figure 2:
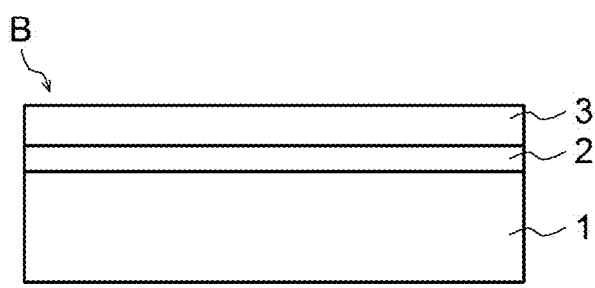
FIG. 2 is a sectional view of an example of a barrier film including a vapor-deposited film and a gas barrier coating film.

FIGS. 1 to 9 illustrate an embodiment of the present invention. FIGS. 1 and 2 are each a sectional view of an example of a barrier film according to the embodiment. A barrier film produced with a film-forming apparatus according to an embodiment includes a substrate 1 and a vapor-deposited film 2, like a barrier film A illustrated in FIG. 1. In the example illustrated in FIG. 1, the vapor-deposited film 2 is located on a surface of the substrate 1. In the example illustrated in FIG. 1, the vapor-deposited film 2 is located at a surface of the barrier film. The barrier film may further include a gas barrier coating film 3 on a surface of the vapor-deposited film 2, like a barrier film B illustrated in FIG. 2.

In this embodiment, the substrate 1 contains polyester. A polyester film can be used as the substrate 1 containing polyester. For example, a film composed of a polyester-based resin, such as poly(ethylene terephthalate), biomass-derived polyester, poly(butylene terephthalate), or poly(ethylene naphthalate), can be used as a polyester film. The polyester film used as the substrate 1 may be stretched in a predetermined direction. In this case, the polyester film may be a uniaxially oriented film stretched in one predetermined direction. The polyester film may be a biaxially oriented film stretched in two predetermined directions. For example, when a film composed of poly(ethylene terephthalate) is used as the substrate 1, a biaxially oriented poly(ethylene terephthalate) film can be used.

The thickness of the polyester film used as the substrate 1 described above is not particularly limited. The polyester film may have any thickness so long as it can be subjected to pretreatment and film formation processing when the vapor-deposited film 2 is formed with the film-forming apparatus described below. The thickness of the polyester film is preferably in the range of 6 μm to 100 μm in view of flexibility and shape retention. When the thickness of the polyester film is within the above range, the polyester film is easily bent and does not break during conveyance. When the thickness of the polyester film is within the above range, the polyester film is easily handled in the film-forming apparatus used for the production of the barrier film including the vapor-deposited film 2 with improved adhesion.

The vapor-deposited film 2 will be described below. The vapor-deposited film 2 contains aluminum oxide. Aluminum is present at the vapor-deposited film 2, for example, in a state where the elemental bond of Al2O3 is formed. The vapor-deposited film 2 may further contain metal oxides, such as silicon oxide, silicon nitride, silicon oxynitride, silicon carbide, magnesium oxide, titanium oxide, tin oxide, indium oxide, zinc oxide, and zirconium oxide, metal nitrides thereof, or carbides thereof. The vapor-deposited film 2 preferably has a thickness of 3 nm or more and 100 nm or less. The vapor-deposited film 2 more preferably has a thickness of 5 nm or more and 50 nm or less.

The gas barrier coating film 3 will be described. The gas barrier coating film 3 mechanically and chemically protects the vapor-deposited film 2. The gas barrier coating film 3 improves the barrier properties of the barrier film B. The gas barrier coating film 3 is laminated so as to be in contact with the vapor-deposited film 2. The gas barrier coating film 3 is a cured film. The gas barrier coating film 3 is formed from a coating agent for a gas barrier coating film, the coating agent being composed of a resin composition containing a metal alkoxide, a hydroxy group-containing water-soluble resin, and a silane coupling agent added as needed.

The gas barrier coating film 3 preferably has a thickness of 100 nm or more and 800 nm or less. When the thickness of the gas barrier coating film 3 is smaller than the above range, the barrier effect of the gas barrier coating film 3 may easily be insufficient. When the thickness of the gas barrier coating film 3 is larger than the above range, the rigidity and brittleness may easily be large.

The metal alkoxide is represented by general formula

$$R_1 n M(OR_2) m \qquad (I)$$

(where in the formula, $R_1$ and $R_2$ are each a hydrogen atom or an organic group having 1 to 8 carbon atoms, M is a metal atom, n is an integer of 0 or more, m is an integer of 1 or more, n+m is the valence of M, multiple $R_1$'s in one molecule may be the same or different, and multiple $R_2$'s in one molecule may be the same or different).

Specific examples of a metal atom represented by M in the metal alkoxide can include silicon, zirconium, titanium, aluminum, tin, lead, and borane. For example, an alkoxysilane, in which M is Si (silicon), is preferably used.

In general formula (I) mentioned above, specific examples of $OR_2$ include alkoxy groups and a phenoxy group, such as a hydroxy group, a methoxy group, an ethoxy group, a n-propoxy group, a n-butoxy group, an isopropoxy group, a butoxy group, a 3-methacryloxy group, a 3-acryloxy group, and a phenoxy group.

Specific examples of $R_1$ described above include a methyl group, an ethyl group, a n-propyl group, an isopropyl group, a phenyl group, a p-styryl group, a 3-chloropropyl group, a trifluoromethyl group, a vinyl group, a γ-glycidoxypropyl group, a methacrylic group, and a γ-aminopropyl group.

Specific examples of the alkoxysilane include various alkoxysilanes and phenoxysilanes, such as tetramethoxysilane, tetraethoxysilane, tetrapropoxysilane, tetraisopropoxysilane, tetrabutoxysilane, tetraphenoxysilane, methyltrimethoxysilane, methyltriethoxysilane, methyltripropoxysilane, methyltributoxysilane, methyltriphenoxysilane, phenylphenoxysilane, ethyltrimethoxysilane, ethyltriethoxysilane, dimethyldimethoxysilane, dimethyldiethoxysilane, n-propyltrimethoxysilane, n-propyltriethoxysilane, isopropyltrimethoxysilane, isopropyltriethoxysilane, dimethyldiethoxysilane, diphenyldimethoxysilane, diphenyldiethoxysilane, vinyltrimethoxysilane, vinyltriethoxysilane, phenyltrimethoxysilane, phenyltriethoxysilane, p-styryltrimethoxysilane, 3-methacryloxypropylmethyldimethoxysilane, 3-methacryloxypropylmethyldiethoxysilane, 3-methacryloxypropyltrimethoxysilane, 3-methacryloxypropyltriethoxysilane, 3-acryloxypropyltrimethoxysilane, 3-acryloxypropyltriethoxysilane, 3-chloropropyltriethoxysilane, trifluoromethyltrimethoxysilane, and 1,6-bis(trimethoxysilyl)hexane. In this embodiment, polycondensates of these alkoxy silanes can also be used. Specifically, for example, polytetramethoxysilane and polytetraethoxysilane can be used.

The silane coupling agent is used for adjusting the crosslink density of a cured film prepared from the metal alkoxide and the hydroxy group-containing water-soluble resin to form a film having barrier properties and hot-water treatment resistance.

The silane coupling agent is represented by general formula:

$R_3 n Si(OR_4)4-n$ (II)

(where in the formula, $R_3$ and $R_4$ are each independently an organic functional group, and n is 1 to 3).

Examples of $R_3$ in general formula (II) include functional groups containing hydrocarbon groups, such as alkyl groups and alkylene groups, an epoxy group, a (meth)acryloxy group, an ureido group, a vinyl group, an amino group, an isocyanurate group, or an isocyanate group. $R_3$'s may be the same or different.

For example, $R_4$ in general formula (II) is an organic functional group having 1 to 8 carbon atoms. $R_4$ is preferably an optionally branched alkyl group having 1 to 8 carbon atoms or an alkoxyalkyl group having 3 to 7 carbon atoms. Examples of the alkyl group having 1 to 8 carbon atoms include a methyl group, an ethyl group, a n-propyl group, an isopropyl group, a n-butyl group, and a sec-butyl group. Examples of the alkoxyalkyl group having 3 to 7 carbon atoms include groups each obtained by removing one hydrogen atom from a linear or branched ether, such as methyl ethyl ether, diethyl ether, methyl propyl ether, methyl isopropyl ether, ethyl propyl ether, ethyl isopropyl ether, methyl butyl ether, ethyl butyl ether, methyl sec-butyl ether, ethyl sec-butyl ether, methyl tert-butyl ether, and ethyl tert-butyl ether. $(OR_4)$'s may be the same or different.

For example, when n=1, examples of the silane coupling agent represented by general formula (II) include 3-glycidoxypropyltrimethoxysilane and 3-glycidoxypropyltriethoxysilane. When n=2, examples of the silane coupling agent represented by general formula (II) include 3-glycidoxypropylmethyldimethoxysilane and 3-glycidoxypropylmethyldiethoxysilane. When n=3, examples of the silane coupling agent represented by general formula (II) include 3-glycidoxypropyldimethylmethoxysilane, 3-glycidoxypropyldimethylethoxysilane, 2-(3,4-epoxycyclohexyl)dimethylmethoxysilane, and 2-(3,4-epoxycyclohexyl)dimethylethoxysilane.

In particular, the crosslink density of the cured film of a barrier coating layer using 3-glycidoxypropylmethyldimethoxysilane or 3-glycidoxypropylmethyldiethoxysilane is lower than that of a system using trialkoxysilane. Thus, the cured film of the barrier coating layer using 3-glycidoxypropylmethyldimethoxysilane or 3-glycidoxypropylmethyldiethoxysilane is a film having excellent gas barrier properties and hot-water treatment resistance, and is a flexible cured film having excellent bending resistance. Thus, the gas barrier properties of a packaging material using the barrier film are not easily deteriorated even after Gelbo flex testing.

As the silane coupling agent, a mixture of silane coupling agents where n=1, 2, and 3 may also be used. The mixing ratio by volume of the mixture and the amount of silane coupling agent used are determined by the design of the cured film of the barrier coating layer.

The hydroxy group-containing water-soluble resin can be subjected to dehydration co-condensation with the metal alkoxide. The hydroxy group-containing water-soluble resin preferably has a degree of saponification of 90% or more and 100% or less. The hydroxy group-containing water-soluble resin more preferably has a degree of saponification of 95% or more and 100% or less. The hydroxy group-containing water-soluble resin even more preferably has a degree of saponification of 99% or more and 100% or less. When the degree of saponification is lower than the above range, the hardness of the barrier coating layer is easily decreased.

Specific examples the hydroxy group-containing water-soluble resin include poly(vinyl alcohol)-based resins, ethylene-vinyl alcohol copolymers, polymers of bifunctional phenolic compounds and bifunctional epoxy compounds. These hydroxy group-containing water-soluble resins may be used alone, in combination as a mixture of two or more, or in the form of a copolymer after copolymerization. Among these, poly(vinyl alcohol) is particularly preferred because of its excellent flexibility and compatibility, and poly(vinyl alcohol)-based resins are suitable.

Specifically, for example, a poly(vinyl alcohol)-based resin prepared by saponification of poly(vinyl acetate) or an ethylene-vinyl alcohol copolymer prepared by saponification of a copolymer of ethylene and vinyl acetate can be used. Examples of the poly(vinyl alcohol)-based resin include PVA-124 (degree of saponification=99%, degree of polymerization=2,400)" available from Kuraray Co., Ltd. and "Gohsenol NM-14 (degree of saponification=99%, degree of polymerization=1,400)" available from Nippon Synthetic Chemical Industry Co., Ltd.

Figure 3:
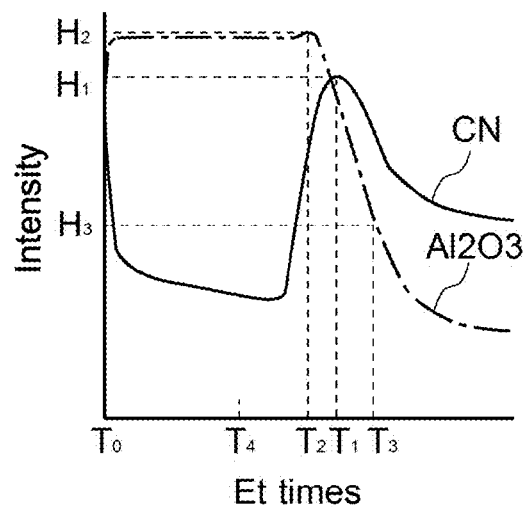
FIG. 3 illustrates an example of a graphical analysis diagram of the results of analyzing the barrier film illustrated in FIG. 1 by time-of-flight secondary ion mass spectrometry.

The composition of the barrier film according to the embodiment will be described in detail. FIG. 3 illustrates an example of a graphical analysis diagram of elements and the intensity of elemental bonds when the elements and the elemental bonds contained in a barrier film are measured. The elements and the elemental bonds contained in the barrier film are measured by time-of-flight secondary ion mass spectrometry (TOF-SIMS) while etching the barrier film illustrated in FIG. 1 from the vapor-deposited film 2 side. The unit (intensity) on the vertical axis of the graph is obtained by taking the common logarithm of the ion intensity. The unit (Et times) on the horizontal axis of the graph is the time of etching.

Specifically, the elements and the elemental bonds at the interface between the vapor-deposited film 2 and the substrate 1 and the elements and the elemental bonds of the vapor-deposited film 2 are measured using a time-of-flight secondary ion mass spectrometer while repeating soft etching at a constant rate with a Cs (cesium) ion gun from the uppermost surface of the vapor-deposited film 2. As a result, it is possible to obtain the respective graphs for the measured elements and elemental bonds. As illustrated in FIG. 3, at least the elemental bond of Al2O3 and the elemental bond of CN are detected in the barrier film according to the embodiment. FIG. 3 illustrates an example of the measurement of the intensity of the elemental bond of Al2O3 and the elemental bond of CN.

As illustrated in FIG. 3, the intensity of the elemental bond of CN has a maximum value $H_1$ at a position $T_1$ on the horizontal axis when measured from the vapor-deposited film 2 side to the substrate 1 side. The position $T_1$ where the intensity of the elemental bond of CN is the maximum value $H_1$ seems to correspond to the interface between the vapor-deposited film 2 and the substrate 1. The portion where the elemental bond of CN is the maximum value $H_1$ is also referred to as a "peak of the elemental bond of CN". Here, for example, the peak of the elemental bond of CN can be defined as described below. First, the maximum value $H_2$ of the intensity of Al2O3 detected and the position $T_2$ on the horizontal axis where the maximum value $H_2$ is obtained are identified. Next, the position $T_3$ of the horizontal axis where the intensity of Al2O3 is $H_3$ that satisfies equation (1) below on the side of the substrate 1 than the position $T_2$ is identified. Then a position $T_4$ where the distance from a position $T_0$ to the position $T_4$ is equal to the distance from the position $T_3$ to the position $T_4$ is identified. In this case, the area where the elemental bond of CN is maximum in the range extending from the position $T_4$ to the position $T_3$ can be defined as the peak of the elemental bond of CN. In the example illustrated in FIG. 3, the elemental bond of CN at the position $T_1$ on the horizontal axis has the maximum value $H_1$ in the range extending from the position $T_3$ to the position $T_4$. It can be said that the peak of the elemental bond of CN is detected at the position $T_1$ on the horizontal axis. The intensity value $H_1$ at the peak of the elemental bond of CN is also referred to as the peak intensity.

[Math. 1]

$$\log_{10} H_3 = \frac{1}{2} \log_{10} H_2 \qquad \text{equation (1)}$$

The inventors have conducted intensive studies and have found that in the barrier film including a vapor-deposited film 2, the ratio of the peak intensity $H_1$ of the elemental bond of CN detected at the interface between the substrate 1 and the vapor-deposited film 2 to the maximum value $H_2$ of the elemental bond of Al2O3 correlates with the adhesion of the barrier film. For example, the inventors have found that a higher ratio of the peak intensity $H_1$ of the elemental bond of CN to the maximum value $H_2$ of the elemental bond of Al2O3 results in a higher adhesion between the substrate 1 and the vapor-deposited film 2. In this embodiment, the peak intensity $H_1$ of the peak of the elemental bond of CN detected at the interface between the substrate 1 and the vapor-deposited film 2 is 0.15 or more times the maximum value $H_2$ of the intensity of the elemental bond of Al2O3. The fact that the value of $H_1$ is 0.15 or more times the value of $H_2$ can enhance the adhesion between the substrate 1 and the vapor-deposited film 2. In the barrier film illustrated in FIG. 1, where the vapor-deposited film 2 is located at the surface of the barrier film, the peak intensity $H_1$ of the peak of the elemental bond of CN may be 0.20 or more times the maximum value $H_2$ of the intensity of the elemental bond of Al2O3. The peak intensity $H_1$ may be 0.30 or more times. In the barrier film where the vapor-deposited film 2 is located at the surface of the barrier film, the peak intensity $H_1$ of the peak of the elemental bond of CN may be 0.70 or less times the maximum value $H_2$ of the intensity of the elemental bond of Al2O3. The peak intensity $H_1$ may be 0.50 or less times.

Figure 4:
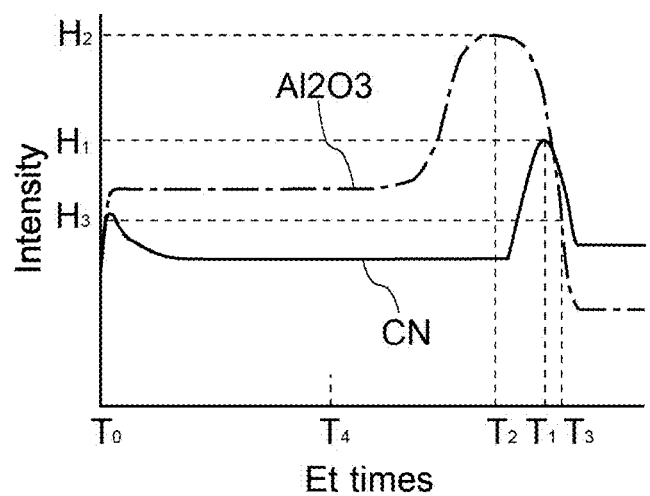
FIG. 4 illustrates an example of a graphical analysis diagram of the results of analyzing the barrier film illustrated in FIG. 2 by time-of-flight secondary ion mass spectrometry.

FIG. 4 illustrates an example of a graphical analysis diagram of elements and the intensity of elemental bonds when the elements and the elemental bonds contained in a barrier film illustrated in FIG. 2 are measured from the gas barrier coating film 3 side. The graphical analysis diagram in FIG. 4 is an example of the elements and the intensity of the elemental bonds measured by time-of-flight secondary ion mass spectrometry. As illustrated in FIG. 4, the peak of the elemental bond of CN detected at the interface between the substrate 1 and the vapor-deposited film 2 can be defined for the barrier film including the gas barrier coating film 3 as illustrated in FIG. 2 in the same manner as for the barrier film not including the gas barrier coating film 3 as illustrated in FIG. 1. The peak of the elemental bond of CN of the barrier film including the gas barrier coating film 3 can be defined on the basis of the measurement results of the elements and the elemental bonds illustrated in FIG. 4. In this case, the peak intensity $H_1$ of the peak of the elemental bond of CN detected at the interface between the substrate 1 and the vapor-deposited film 2 is 0.15 or more times the maximum value $H_2$ of the intensity of the elemental bond of Al2O3. In the barrier film including the gas barrier coating film 3 illustrated in FIG. 2, the peak intensity $H_1$ of the peak of the elemental bond of CN may be 0.30 or less times or 0.20 or less times the maximum value $H_2$ of the intensity of the elemental bond of Al2O3.

The barrier film according to the embodiment has higher adhesion between the substrate 1 and the vapor-deposited film 2 than before. This can result in improved barrier properties of the barrier film, the barrier properties of a laminate including the barrier film, and the barrier properties of a packaging product including the laminate than before.

(Film-Forming Apparatus)

Figure 5:
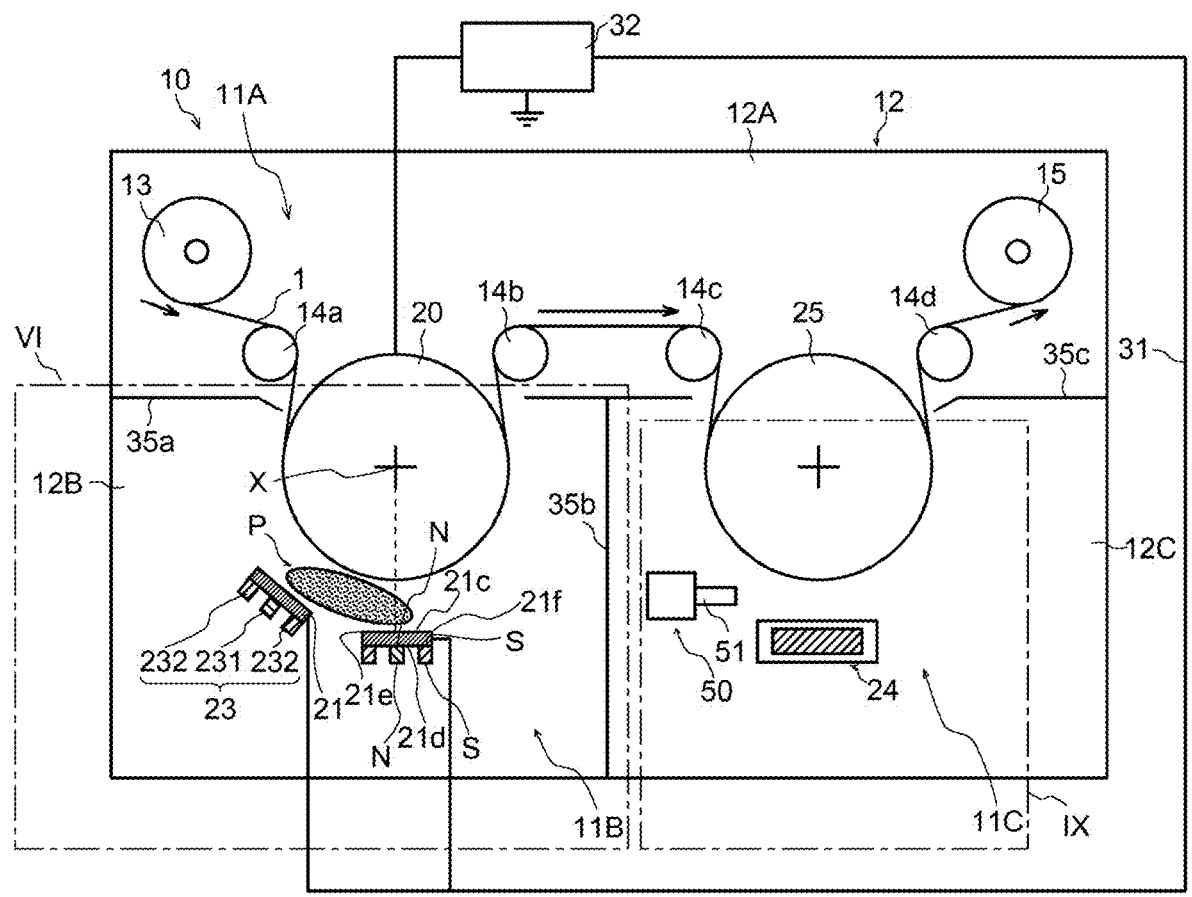
FIG. 5 illustrates an example of a film-forming apparatus according to an embodiment of the present invention.

An example of a film-forming apparatus 10 used in a method for producing a barrier film will be described below. As illustrated in FIG. 5, the film-forming apparatus 10 includes a substrate-conveying mechanism 11A, a plasma pretreatment mechanism 11B, and a film formation mechanism 11C. In the example illustrated in FIG. 5, the film-forming apparatus 10 further includes a pressure reduction chamber 12. The substrate-conveying mechanism 11A conveys the substrate 1. The plasma pretreatment mechanism 11B subjects a surface of the substrate 1 to plasma pretreatment. The film formation mechanism 11C forms the vapor-deposited film 2. The pressure reduction chamber 12 includes a pressure reduction mechanism, such as a vacuum pump described below. The pressure reduction mechanism adjusts the atmosphere of at least part of the space inside the pressure reduction chamber 12 to a pressure lower than or equal to atmospheric pressure.

In the example of FIG. 5, the pressure reduction chamber 12 includes a substrate-conveying compartment 12A, a plasma pretreatment compartment 12B, and a film formation compartment 12C. The substrate-conveying mechanism 11A is located in the substrate-conveying compartment 12A. The plasma pretreatment mechanism 11B is located in the plasma pretreatment compartment 12B. The film formation mechanism 11C is located in the film formation compartment 12C. The pressure reduction chamber 12 preferably inhibits the atmospheres inside the compartments from mixing with each other. For example, as illustrated in FIG. 5, the pressure reduction chamber 12 may include partitions 35a to 35c. The partitions 35a to 35c are located between the substrate-conveying compartment 12A and the plasma pretreatment compartment 12B, between the plasma pretreatment compartment 12B and the film formation compartment 12C, and between the substrate-conveying compartment 12A and the film formation compartment 12C to separate the compartments.

The substrate-conveying compartment 12A, the plasma pretreatment compartment 12B, and the film formation compartment 12C will be described. Each of the plasma pretreatment compartment 12B and the film formation compartment 12C is in contact with the substrate-conveying compartment 12A. Each of the plasma pretreatment compartment 12B and the film formation compartment 12C includes a portion communicating with the substrate-conveying compartment 12A. This enables the conveyance of the substrate 1 between the substrate-conveying compartment 12A and the plasma pretreatment compartment 12B and between the substrate-conveying compartment 12A and the film formation compartment 12C while the substrate 1 is not exposed to the atmosphere. For example, between the substrate-conveying compartment 12A and the plasma pretreatment compartment 12B, the substrate 1 can be conveyed through an opening in the partition 35a. A structure between the substrate-conveying compartment 12A and the film formation compartment 12C is similar to that between the substrate-conveying compartment 12A and the plasma pretreatment compartment 12B. Thus, the substrate 1 can be conveyed between the substrate-conveying compartment 12A and the film formation compartment 12C.

The function of the pressure reduction mechanism of the pressure reduction chamber 12 will be described. The pressure reduction mechanism of the pressure reduction chamber 12 can reduce the pressure of the atmosphere of at least the space, in which the plasma pretreatment mechanism 11B or the film formation mechanism 11C in the film-forming apparatus 10 is disposed, to a pressure lower than or equal to atmospheric pressure. The pressure reduction mechanism may be able to reduce the pressure in the substrate-conveying compartment 12A, the plasma pretreatment compartment 12B, and the film formation compartment 12C separated by the partitions 35a to 35c to a pressure lower than or equal to atmospheric pressure.

The configuration of the pressure reduction mechanism of the pressure reduction chamber 12 will be described. The pressure reduction chamber 12 may include, for example, a vacuum pump. The vacuum pump is connected to the plasma pretreatment compartment 12B. The pressure in the plasma pretreatment compartment 12B during plasma pretreatment as described below can be appropriately controlled by adjusting the vacuum pump. It is possible to inhibit plasma supplied to the plasma pretreatment compartment 12B from diffusing into other compartments by a method described below. The pressure reduction mechanism of the pressure reduction chamber 12 may include a vacuum pump connected to the film formation compartment 12C. The vacuum pump connected to the film formation compartment 12C is similar to the vacuum pump connected to the plasma pretreatment compartment 12B. Examples of the vacuum pump that can be used include dry pumps, turbo molecular pumps, cryopumps, rotary pumps, and diffusion pumps.

The substrate-conveying mechanism 11A configured to convey the substrate 1 in the film-forming apparatus 10 according to the embodiment will be described. The conveyance route of the substrate 1 will also be described. The substrate-conveying mechanism 11A is a mechanism for conveying the substrate 1. The substrate-conveying mechanism 11A is located in the substrate-conveying compartment 12A. In the example illustrated in FIG. 5, the substrate-conveying mechanism 11A includes an unwinding roller 13, a winding roller 15, and guide rolls 14a to 14d. An original roll of the substrate 1 is attached to the unwinding roller 13. The winding roller 15 winds up the substrate 1. The substrate 1 fed from the substrate-conveying mechanism 11A is then conveyed by a pretreatment roller 20 described below and a film formation roller 25 described below. The pretreatment roller 20 is located in the plasma pretreatment compartment 12B. The film formation roller 25 is located in the film formation compartment 12C.

Although not illustrated, the substrate-conveying mechanism 11A may further include a tension pickup roller. When the substrate-conveying mechanism 11A includes the tension pickup roller, the substrate 1 can be conveyed while adjusting the tension applied to the substrate 1.

(Plasma Pretreatment Mechanism)

The plasma pretreatment mechanism 11B will be described. The plasma pretreatment mechanism 11B subjects a surface of the substrate 1 to plasma pretreatment. The plasma pretreatment mechanism 11B illustrated in FIG. 5 generates plasma P. The plasma pretreatment mechanism 11B subjects the surface of the substrate 1 to plasma pretreatment using the plasma P. The plasma pretreatment activates the surface of the substrate 1. This enables nitrogen contained inside the substrate 1 to collect easily on the surface of the substrate 1 or enables nitrogen contained in the environment around the substrate 1 to be easily incorporated into the surface of the substrate 1. Thus, when the vapor-deposited film 2 is formed on the plasma-pretreated surface of the substrate 1, the peak of the elemental bond of CN can be provided at the interface between the substrate 1 and the vapor-deposited film 2. The plasma pretreatment mechanism 11B illustrated in FIG. 5 includes the pretreatment roller 20, electrode sections 21, and magnetic field generation sections 23. The pretreatment roller 20 is located in the plasma pretreatment compartment 12B. The electrode sections 21 face the pretreatment roller 20. The magnetic field generation sections 23 generate magnetic fields between the pretreatment roller 20 and the electrode section 21.

Figure 6:
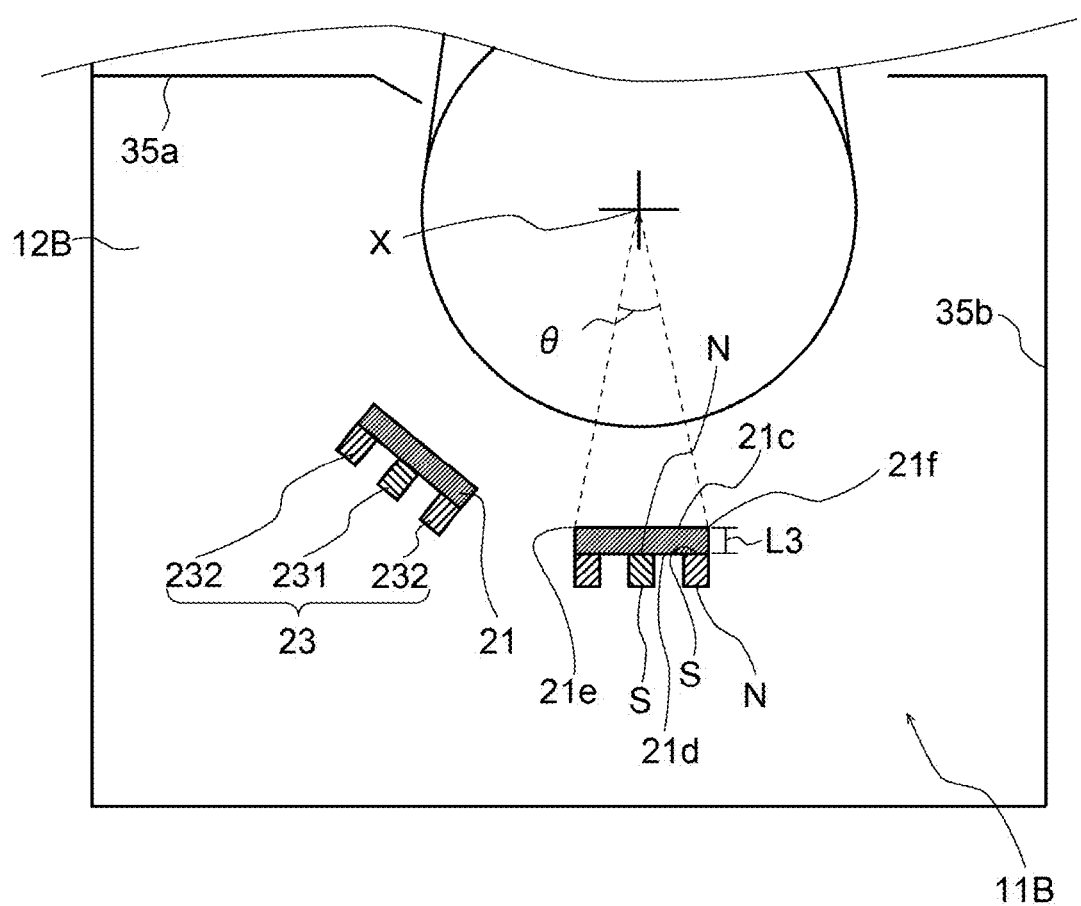
FIG. 6 is a sectional view illustrating an example of the plasma pretreatment mechanism of the film-forming apparatus.

The pretreatment roller 20 will be described. FIG. 6 is an enlarged view of an area surrounded by a dot-dash line marked with the symbol VI in FIG. 5. In FIG. 6, a power supply wiring 31 and the plasma P generated by the plasma pretreatment mechanism 11B, which are illustrated in FIG. 5, are omitted. The power supply wiring 31 connects a power supply 32 to the electrode sections 21 described below. The pretreatment roller 20 has a rotation axis X. The pretreatment roller 20 is disposed in such a manner that at least the rotation axis X is located in the plasma pretreatment compartment 12B, which is separated by the partitions 35a and 35b. The substrate 1 is wrapped around the pretreatment roller 20. The substrate 1 has a dimension in the direction of the rotation axis X. In the following description, the dimension of the substrate 1 in the direction of the rotation axis X is also referred to as the "width of the substrate 1". The direction of the rotation axis X is also referred to as the "width direction of the substrate 1".

As illustrated in FIG. 5, part of the pretreatment roller 20 may be exposed toward the substrate-conveying compartment 12A. In the example illustrated in FIG. 5, the plasma pretreatment compartment 12B communicates with the substrate-conveying compartment 12A through the opening in the partition 35a. Part of the pretreatment roller 20 is exposed toward the substrate-conveying compartment 12A through the opening in the partition 35a. There is a gap between the partition 35a and the pretreatment roller 20, the partition 35a being disposed between the substrate-conveying compartment 12A and the plasma pretreatment compartment 12B. The substrate 1 can be conveyed from the substrate-conveying compartment 12A to the plasma pretreatment compartment 12B through the gap. Although not illustrated, the pretreatment roller 20 may be disposed in such a manner that the entire pretreatment roller is located in the plasma pretreatment compartment 12B.

Although not illustrated, the pretreatment roller 20 may include a temperature control mechanism. The temperature control mechanism adjusts the temperature of the surface of the pretreatment roller 20. For example, the pretreatment roller 20 may include a temperature control mechanism inside the pretreatment roller 20. The temperature control mechanism may include piping that circulates a temperature control medium, such as a cooling medium or a heating medium. The temperature control mechanism adjusts the temperature of the surface of the pretreatment roller 20 to a target temperature. The target temperature is within the range of, for example, −20° C. to 100° C.

When the pretreatment roller 20 include the temperature control mechanism, it is possible to suppress shrinkage and damage of the substrate 1 due to heat during the plasma pretreatment.

The pretreatment roller 20 is composed of a material containing at least one or more of stainless steel, iron, copper, and chromium. The surface of the pretreatment roller 20 may be subjected to hard-coating treatment using, for example, hard chromium for scratch prevention. These materials are easily processed. The use of the above material as the material of the pretreatment roller 20 allows the pretreatment roller 20 to have higher thermal conductivity. This facilitates the control of the temperature of the pretreatment roller 20.

The electrode sections 21 will be described. In the example illustrated in FIGS. 5 and 6, each of the electrode sections 21 includes a first surface 21c facing the pretreatment roller 20 and a second surface 21d located on the opposite side of each electrode section from the first surface 21c. In the example illustrated in FIGS. 5 and 6, the electrode section 21 is a plate-like member, and the first surface 21c and the second surface 21d are both flat. An AC voltage is applied across the electrode section 21 and the pretreatment roller 20. As a result, the electrode section 21 generates plasma between the electrode section and the pretreatment roller 20. The electrode section 21 preferably generates an electric field between the electrode section and the pretreatment roller 20. The electric field directs the generated plasma to the surface of the substrate 1. The electric field allows the generated plasma to move perpendicularly to the surface of the substrate 1. This enables efficient pretreatment of the substrate 1. This can increase the peak intensity $H_1$ of the peak of the elemental bond of CN formed at the interface between the substrate 1 and the vapor-deposited film 2 when the vapor-deposited film 2 is formed on the plasma-pretreated surface of the substrate 1.

Two or more electrode sections 21 may preferably be provided. The two or more electrode sections 21 are preferably arranged in the conveying direction of the substrate 1. In the example illustrated in FIGS. 5 and 6, an example in which the film-forming apparatus 10 includes two electrode sections 21 is illustrated. Twelve or less electrode sections 21 are, for example, provided.

The effect of the fact that two or more electrode sections 21 are arranged in the conveying direction of the substrate 1 will be described. As described above, the plasma is generated between the electrode sections 21 and the pretreatment roller 20. A region where the plasma is generated expands as the dimension of each electrode section 21 in the conveying direction increases. When each electrode section 21 is a flat plate-like member, a larger dimension of the electrode section 21 in the conveying direction results in a larger distance from each end portion of the first surface 21c in the conveying direction to the pretreatment roller 20. The first surface 21c is a surface of each electrode section 21 facing the pretreatment roller 20. A larger distance from each end portion of the first surface 21c in the conveying direction to the pretreatment roller 20 results in a deterioration in the treatment capacity with the plasma.

In the film-forming apparatus 10, two or more electrode sections 21 are arranged in the conveying direction of the substrate 1. Thus, even in the case of a small dimension of each electrode section 21 in the conveying direction of the substrate 1, plasma can be generated over a wide region in the conveying direction. In addition, a reduction in the dimension of each electrode section 21 enables a reduction in the distance from each end portion of the first surface 21c of the electrode section 21 in the conveying direction to the pretreatment roller 20. This makes it possible to uniformly generate plasma in the conveying direction.

As illustrated in FIGS. 5 and 6, the electrode section 21 includes a first end portion 21e and a second end portion 21f located on the first surface 21c of the electrode section 21. The first end portion 21e is an upstream end portion in the conveying direction of the substrate 1. The second end portion 21f is a downstream end portion in the conveying direction of the substrate 1. As described above, a reduction in the dimension of each electrode section 21 in the conveying direction of the substrate 1 enables a reduction in the distance from the first end portion 21e of the electrode section 21 in the conveying direction to the pretreatment roller 20. In addition, it is possible to reduce the distance from the second end portion 21f to the pretreatment roller 20. The dimension of the electrode section 21 in the conveying direction of the substrate 1 corresponds to the angle $\theta$ illustrated in FIG. 6. The angle $\theta$ is the angle formed by a straight line passing through the first end portion 21e and the rotation axis X and a straight line passing through the second end portion 21f and the rotation axis X. The angle $\theta$ is preferably 20° or more and 90° or less. The angle $\theta$ is more preferably 60° or less. The angle $\theta$ is even more preferably 45° or less. An angle $\theta$ in the above range results in the uniform generation of plasma in the conveying direction between the electrode section 21 and the pretreatment roller 20 when the first surface 21c of the electrode section 21 is flat.

The material of the electrode section 21 is not particularly limited as long as it is conductive. Specifically, aluminum, copper, or stainless steel is suitably used as the material of the electrode section 21.

The thickness L3 of each of the electrode sections 21 when viewed in the direction perpendicular to the first surface 21c of each electrode section 21 is not particularly limited. The thickness L3 is, for example, 15 mm or less. When the thickness of each electrode section 21 is the above value, the magnetic field generation sections 23 can effectively generate magnetic fields between the pretreatment roller 20 and the electrode sections 21. The thickness L3 of each electrode section 21 is, for example, 3 mm or more.

The magnetic field generation sections 23 will be described. As illustrated in FIGS. 5 and 6, each magnetic field generation section 23 is disposed on a side of a corresponding one of the electrode sections 21 opposite from the side facing the pretreatment roller 20. The magnetic field generation sections 23 are members configured to generate magnetic fields between the pretreatment roller 20 and the electrode sections 21. The magnetic fields between the pretreatment roller 20 and the electrode sections 21 contribute to the generation of higher-density plasma, for example, when plasma is generated using the plasma pretreatment mechanism 11B. Each of the magnetic field generation sections 23 illustrated in FIGS. 5 and 6 includes a first magnet 231 and a second magnet 232 on the second surface 21d of a corresponding one of the electrode sections 21.

Two or more magnetic field generation sections 23 are preferably provided. When the plasma pretreatment mechanism 11B includes two or more electrode sections 21 and two or more magnetic field generation sections 23, each of the two or more magnetic field generation sections 23 is preferably disposed on a corresponding one of the two or more electrode sections 21. Each of the two or more magnetic field generation sections 23 is preferably disposed on a side of a corresponding one of the electrode sections 21 opposite from the side facing the pretreatment roller 20. In the example illustrated in FIGS. 5 and 6, each of the two magnetic field generation sections 23 is disposed on the second surface 21d of a corresponding one of the two electrode sections 21.

The structure of each first magnet 231 and each second magnet 232 in the direction normal to the second surface 21d of each electrode section 21 will be described. As illustrated in FIGS. 5 and 6, the first magnet 231 and the second magnet 232 each have a north pole and a south pole. The symbol N illustrated in each of FIGS. 5 and 6 indicates the north pole of the first magnet 231 or the second magnet 232. The symbol S illustrated in each of FIGS. 5 and 6 indicates the south pole of the first magnet 231 or the second magnet 232. One of the north and south poles of each first magnet 231 is located closer to the substrate 1 than the other is. One of the north and south poles of the second magnet 232 is located closer to the substrate 1 than the other is. In the example illustrated in FIGS. 5 and 6, the north pole of the first magnet 231 is located closer to the substrate 1 than the south pole of the first magnet 231 is. In the example illustrated in FIGS. 5 and 6, the south pole of the second magnet 232 is located closer to the substrate 1 than the north pole of the second magnet is. Although not illustrated, the south pole of the first magnet 231 may be located closer to the substrate 1 than the north pole of the first magnet 231 is, and the north pole of the second magnet 232 may be located closer to the substrate 1 than the south pole of the second magnet 232 is.

Figure 7:
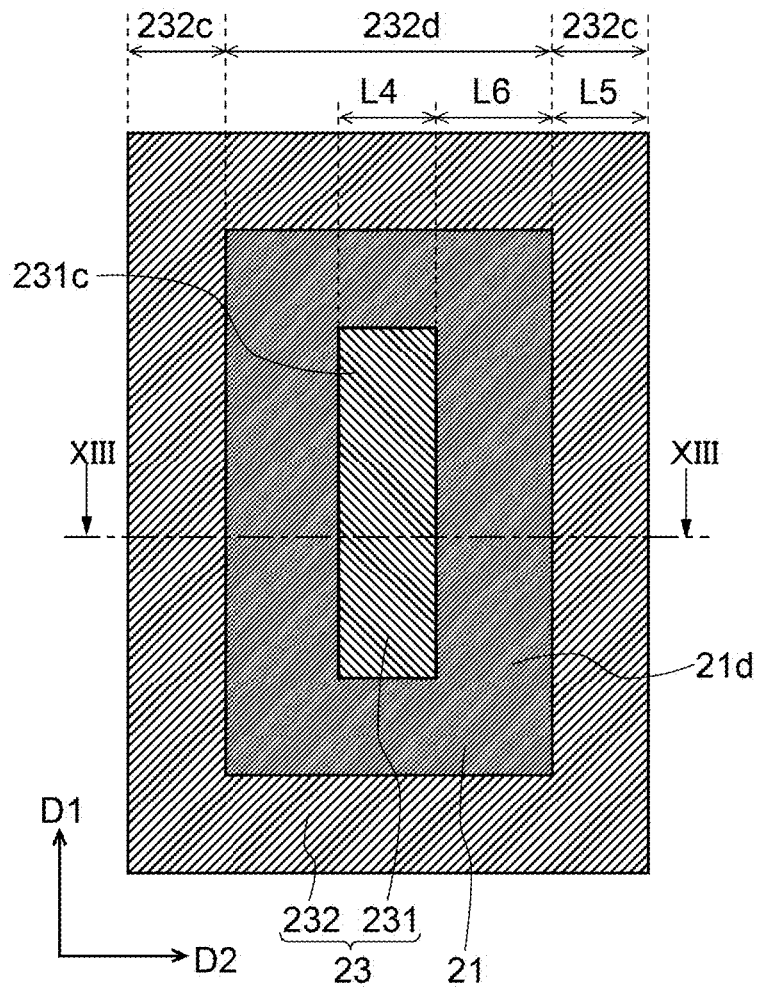
FIG. 7 is a plan view illustrating an example of the electrode section and the magnetic field generation section of the plasma pretreatment mechanism of the film-forming apparatus.
Figure 8:
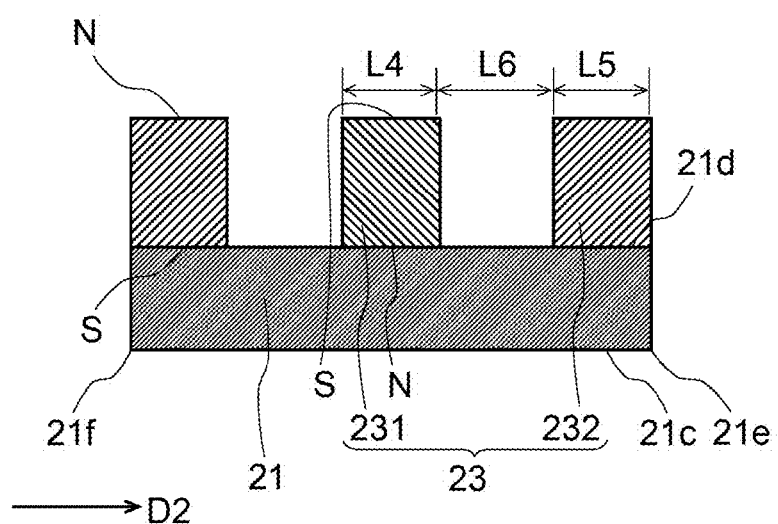
FIG. 8 is a sectional view illustrating an example of the electrode section and the magnetic field generation section of the plasma pretreatment mechanism of the film-forming apparatus.

The structure of the first magnet 231 and the second magnet 232 in the plane direction of the second surface 21d of each electrode section 21 will be described. FIG. 7 is a plan view of the electrode section 21 and the magnetic field generation section 23 illustrated in FIG. 5 when viewed from the magnetic field generation section 23 side. FIG. 8 is a sectional view illustrating a cross section taken along line VIII-VIII of FIG. 7. In FIG. 7, direction D1 is the direction in which the rotation axis X of the pretreatment roller 20 extends.

As illustrated in FIGS. 7 and 8, the first magnet 231 includes a first axial portion 231c. As illustrated in FIG. 7, the first axial portion 231c extends in the direction D1. That is, the first axial portion 231c extends along the rotation axis X of the pretreatment roller 20. The first magnet 231 on one electrode section 21 may include one first axial portion 231c. The first magnet 231 may include two or more first axial portions 231c. In the example illustrated in FIG. 7, the first magnet 231 on one electrode section 21 includes one first axial portion 231c.

As illustrated in FIGS. 7 and 8, the second magnet 232 includes a second axial portion 232c. As illustrated in FIG. 7, the second axial portion 232c also extends in the direction D1, like the first axial portion 231c. That is, the second axial portion 232c extends along the rotation axis X.

Each of the first magnet 231 and the second magnet 232 includes the portion extending along the rotation axis X; this enables an improvement in the uniformity of the intensity of the magnetic field generated around the substrate 1 in the width direction of the substrate 1. This makes it possible to improve the uniformity of the distribution density of the plasma generated around the substrate 1 in the width direction of the substrate 1.

The second magnet 232 disposed on one electrode section 21 may include one second axial portion 232c. The second magnet 232 may include two or more second axial portions 232c. In the example illustrated in FIGS. 7 and 8, the second magnet 232 on one electrode section 21 includes two second axial portions 232c. The two second axial portions 232c may be located so as to interpose the first axial portion 231c therebetween in the direction D2. The direction D2 is a direction orthogonal to the rotation axis X among the surface directions of the second surface 21d of the electrode section 21.

Dimensions L4 and L5 illustrated in FIG. 8 are not particularly limited. The dimension L4 indicates the dimension of the first axial portion 231c in the conveying direction of the substrate 1. The dimension L5 indicates the dimension of the second axial portion 232c in the conveying direction of the substrate 1. The ratio of the dimension L4 of the first axial portion 231c to the dimension L5 of the second axial portion 232c in the conveying direction of the substrate 1 is not particularly limited. The dimension L4 of the first axial portion 231c may be equal to the dimension L5 of the second axial portion 232c. The dimension L4 of the first axial portion 231c may be greater than the dimension L5 of the second axial portion 232c.

A spacing L6 is set in such a manner that the magnetic field generated by the first axial portion 231c and the second axial portion 232c is located between the pretreatment roller 20 and the electrode section 21. The spacing L6 is the distance between the first axial portion 231c and the second axial portion 232c in the direction D2.

The second magnet 232 may surround the first magnet 231 when the magnetic field generation section 23 is observed from the direction normal to the second surface 21d of the electrode section 21. For example, as illustrated in FIG. 7 the second magnet 232 may include two connecting portions 232d along with the two second axial portions 232c. The two connecting portions 232d are disposed so as to connect the two second axial portions 232c.

Examples of magnets, such as the first magnet 231 and the second magnet 232, used as the magnetic field generation sections 23 include permanent magnets, such as ferrite magnets, and rare-earth magnets, such as neodymium and samarium cobalt (Sm—Co). Electromagnets can also be used as the magnetic field generation sections 23.

The magnets of the magnetic field generation sections 23, such as the first magnet 231 and the second magnet 232, have a magnetic flux density of, for example, 100 G or more and 10,000 G or less. A magnetic flux density of 100 G or more enables the generation of a sufficiently strong magnetic field between the pretreatment roller 20 and the electrode section 21. This enables the generation of plasma with sufficiently high density. Thus, a good pretreated surface can be formed at high speed. When the magnetic flux density at the surface of the substrate 1 is higher than 10,000 G, an expensive magnet or magnetic field generation mechanism is required.

Although not illustrated, the plasma pretreatment mechanism 11B may include a plasma source gas supply section. The plasma source gas supply section supplies a plasma source gas into the plasma pretreatment compartment 12B. The configuration of the plasma source gas supply section is not particularly limited. For example, the plasma source gas supply section includes a hole in the wall of the plasma pretreatment compartment 12B. The plasma source gas is jetted out of the hole in the wall of the plasma pretreatment compartment 12B. The plasma source gas supply section may include a nozzle. The plasma source gas is ejected from the nozzle at a position closer to the substrate 1 than the wall of the plasma pretreatment compartment 12B is. For example, an inert gas, such as argon, an active gas, such as oxygen, nitrogen, carbon dioxide gas, or ethylene, or a mixed gas of these gases is fed as the plasma source gas by the plasma source gas supply section. One of the inert gases may be used alone as the plasma source gas. One of the active gases may be used alone as the plasma source gas. A mixed gas of two or more of the gases among inert gases or active gases may be used as the plasma source gas. As the plasma source gas, a mixed gas of an inert gas, such as argon, and an active gas is preferably used. For example, the plasma source gas supply section supplies a mixed gas of argon (Ar) and oxygen ($O_2$).

For example, the plasma pretreatment mechanism 11B supplies plasma having a plasma density of 100 W·sec/m² or more and 8,000 W·sec/m² or less between the pretreatment roller 20 and the electrode sections 21.

In the example illustrated in FIG. 2, the plasma pretreatment mechanism 11B is disposed in the plasma pretreatment compartment 12B separated from the substrate-conveying compartment 12A and the film formation compartment 12C by partitions. Since the plasma pretreatment compartment 12B is separated from other areas, such as the substrate-conveying compartment 12A and the film formation compartment 12C, the atmosphere in the plasma pretreatment compartment 12B can be easily controlled independently. This facilitates, for example, the control of the concentration of the plasma source gas in the space where the pretreatment roller 20 and the electrode sections 21 face each other, thereby improving the productivity of the laminated film.

In this embodiment, the voltage applied across the pretreatment roller 20 and each electrode section 21 of the plasma pretreatment mechanism 11B is an AC voltage. The application of the AC voltage generates plasma between the pretreatment roller 20 and the electrode sections 21. Preferably, an electric field is generated by the application of an AC voltage. The electric field directs the generated plasma to the surface of the substrate 1. The electric field allows the generated plasma to move perpendicularly to the surface of the substrate 1.

The value of the AC voltage applied across the pretreatment roller 20 and each electrode sections 21 is preferably 250 V or more and 1,000 V or less. When the AC voltage has the above value, plasma having a sufficient plasma density can be generated between the pretreatment roller 20 and the electrode sections 21. The value of the AC voltage refers to an effective value Ve. When the maximum value of the AC voltage is denoted as Vm, the effective value Ve of the AC voltage is calculated using equation (2) below.

[Math. 2]

$$V_e = V_m/\sqrt{2}$$ equation (2)

The AC voltage applied across the pretreatment roller 20 and each electrode sections 21 has a frequency of, for example, 20 kHz or more and 500 kHz or less.

(Film Formation Mechanism)

The film formation mechanism 11C will be described below. In the example illustrated in FIG. 5, the film formation mechanism 11C includes a film formation roller 25 disposed in the film formation compartment 12C and an evaporation mechanism 24.

The film formation roller 25 will be described. The film formation roller 25 is a roller to convey the substrate 1. The substrate 1 is wrapped around the film formation roller 25 while the treated surface of the substrate 1 that has been pretreated in the plasma pretreatment mechanism 11B faces outward.

The material of the film formation roller 25 will be described. The film formation roller 25 is preferably composed of a material containing at least one or more of stainless steel, iron, copper, and chromium. The surface of the film formation roller 25 may be subjected to hard-coating treatment using, for example, hard chromium for scratch prevention. These materials are easily processed. The use of the above material as the material of the film formation roller 25 allows the film formation roller 25 to have higher thermal conductivity. This provides excellent temperature controllability when the temperature control is performed. The average surface roughness Ra of the surface of the film formation roller 25 is, for example, 0.1 μm or more and 10 μm or less.

Although not illustrated, the film formation roller 25 may include a temperature control mechanism to adjust the surface temperature of the film formation roller 25. The temperature control mechanism includes, for example, a circulation channel inside the film formation roller 25. A cooling medium or heating medium is circulated through the circulation channel. The cooling medium (refrigerant) is, for example, an aqueous solution of ethylene glycol. The heating medium (heat transfer medium) is, for example, silicone oil. The temperature control mechanism may include a heater. The heater is disposed at a position facing the film formation roller 25. When the film formation mechanism 11C forms a film by the vapor deposition method, the temperature control mechanism adjusts the surface temperature of the film formation roller 25 to a target temperature in view of the heat resistance limitations and the general-purpose versatility of the associated mechanical components. The target temperature is preferably within the range of −20° C. to 200° C. When the film formation roller 25 includes the temperature control mechanism, it is possible to suppress fluctuations in the temperature of the substrate 1 caused by the heat generated during film formation.

Figure 9:
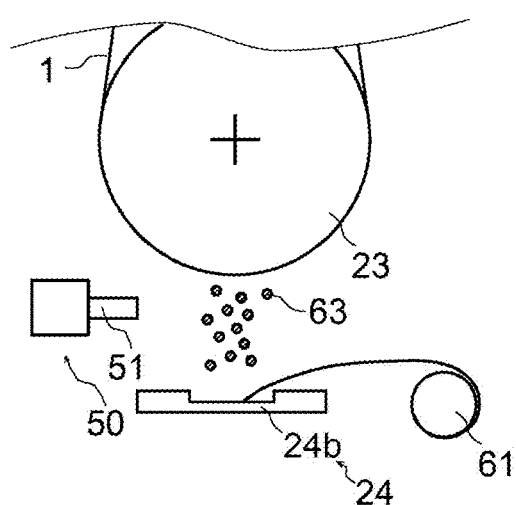
FIG. 9 is a sectional view illustrating an example of the film formation mechanism of the film-forming apparatus.

The evaporation mechanism 24 will be described. FIG. 9 is an enlarged view of an area surrounded by a dot-dash line marked with the symbol IX in FIG. 5. FIG. 9 illustrates the specific configuration of the evaporation mechanism 24, which is omitted in FIG. 5. FIG. 9 illustrates the vapor deposition material supply section 61, which is omitted in FIG. 5, configured to supply the vapor deposition material. In FIG. 9, the pressure reduction chamber 12 and the partitions 35b and 35c are omitted. The evaporation mechanism 24 is a mechanism for evaporating a vapor deposition material containing aluminum. The evaporated vapor deposition material adheres to the substrate 1 to form a vapor-deposited film containing aluminum on the surface of the substrate 1. The evaporation mechanism 24 in this embodiment employs a resistance heating type. In the example illustrated in FIG. 9, the evaporation mechanism 24 includes a boat 24b. In this embodiment, the boat 24b includes a power supply (not illustrated) and a resistive element (not illustrated) electrically connected to the power supply. Multiple boats 24b may be arranged in the width direction of the substrate 1.

As illustrated in FIG. 9, the film formation mechanism 11C may include the vapor deposition material supply section 61. The vapor deposition material supply section 61 supplies a vapor deposition material to the evaporation mechanism 24. FIG. 9 illustrates an example in which the vapor deposition material supply section 61 continuously feeds an aluminum metal wire rod.

Although not illustrated, the film formation mechanism 11C includes a gas supply mechanism. The gas supply mechanism supplies a gas between the evaporation mechanism 24 and the film formation roller 25. The gas supply mechanism supplies at least oxygen gas. The oxygen gas reacts or combines with the evaporation material, such as aluminum, which has evaporated from the evaporation mechanism 24 toward the substrate 1 on the film formation roller 25. This enables the formation of a vapor-deposited film containing aluminum oxide on the surface of the substrate 1.

The film formation mechanism 11C also includes a plasma supply mechanism 50. The plasma supply mechanism 50 supplies plasma between the surface of the substrate 1 and the evaporation mechanism 24. In the example illustrated in FIGS. 5 and 9, the plasma supply mechanism 50 includes a hollow cathode 51. In this embodiment, the hollow cathode 51 is a cathode having a cavity that is partially open. The hollow cathode 51 can generate plasma in the cavity. In the example illustrated in FIG. 9, the hollow cathode 51 is disposed in such a manner that the opening of the cavity of the hollow cathode 51 is located diagonally above the boat 24b. Although not illustrated, the plasma supply mechanism 50 according to the embodiment includes an anode opposite the aperture. The anode draws plasma from the opening of the cavity of the hollow cathode 51. The plasma supply mechanism 50 according to the embodiment can generate plasma in the cavity of the hollow cathode 51 and draw the plasma between the surface of the substrate 1 and the evaporation mechanism 24 using the opposing anode, thereby generating a strong plasma between the surface of the substrate 1 and the evaporation mechanism 24. The position of the opposing anode is not limited as long as the plasma can be drawn out of the opening of the cavity of the hollow cathode 51 by the opposing anode and supplied between the surface of the substrate 1 and the evaporation mechanism 24. In this embodiment, the case where the opposing anodes are disposed on the sides of the boat 24b in the width direction of the substrate 1 will be described. In this case, the film formation mechanism 11C may include the multiple boats 24B and multiple opposing anodes. The multiple boats 24b and the multiple opposing anodes may be alternately arranged in the width direction of the substrate 1. Although not illustrated, the plasma supply mechanism 50 may include a source material supply device. The source material supply device supplies a plasma source gas into at least the cavity of the hollow cathode 51. As the plasma source gas supplied by the source supply device, for example, the same gas that can be used as the plasma source gas supplied by the plasma source gas supply section of the plasma pretreatment mechanism 11B can be used.

The plasma supply mechanism 50 supplies plasma between the surface of the substrate 1 and the evaporation mechanism 24 to activate the aluminum evaporated from the evaporation mechanism 24 and the oxygen gas, thereby promoting the reaction or combination of aluminum and the oxygen gas. This can achieve a higher proportion of aluminum present in the form of aluminum oxide in the vapor-deposited film 2 formed on the surface of the substrate 1. It is thus possible to stabilize the characteristics of the vapor-deposited film 2.

Although not illustrated, the film-forming apparatus 10 may include a substrate charge removal section in a portion of the substrate-conveying compartment 12A located downstream of the film formation compartment 12C in the conveying direction of the substrate 1. The substrate charge removal section conducts post-treatment to remove charges generated on the substrate 1 due to the film formation by the film formation mechanism 11C. The substrate charge removal section may be provided to remove charges on one surface of the substrate 1. The substrate charge removal section may be provided to remove charges on both surfaces of the substrate 1.

A device used as a substrate charge removal section configured to conduct the post-treatment for the substrate 1 is not particularly limited. For example, a plasma discharge device, an electron beam irradiation device, an ultraviolet irradiation device, a static eliminator bar, a glow discharge device, or a corona treatment device can be used as the substrate charge removal section.

When post-treatment is performed by generating an electrical discharge using a plasma treatment device or glow discharge device, an electrical discharge gas, such as argon, oxygen, nitrogen, or helium, is supplied alone or in combination as a mixed gas thereof near the substrate 1, and post-treatment can be performed using any electrical discharge method. Examples of the electrical discharge method include alternating current (AC) plasma, direct current (DC) plasma, arc discharge, microwave, and surface wave plasma. In a reduced-pressure environment, the post-treatment is most preferably conducted using a plasma discharge device.

The substrate charge removal section is disposed in the portion of the substrate-conveying compartment 12A located downstream of the film formation compartment 12C in the conveying direction of the substrate 1 and removes the charges on the substrate 1, so that the substrate 1 can be quickly separated from the film formation roller 25 at a predetermined position and conveyed. This enables stable conveyance of the substrate. In addition, damage and a deterioration in the quality of the substrate 1 due to charging are suppressed. This can improve the wettability of the front and back surfaces of the substrate, thereby improving the suitability for the subsequent processing.

(Power Supply)

In the example illustrated in FIG. 5, the film-forming apparatus 10 further includes the power supply 32. The power supply 32 is electrically connected to the pretreatment roller 20 and the electrode sections 21. In the example illustrated in FIG. 5, the power supply 32 is electrically connected to the pretreatment roller 20 and the electrode sections 21 via the power supply wiring 31. The power supply 32 is, for example, an AC power supply. When the power supply 32 is an AC power supply, the power supply 32 can apply an AC voltage having a frequency of, for example, 20 kHz or more and 500 kHz or less across the pretreatment roller 20 and each electrode section 21. The input power (the power that can be applied per meter width of each electrode section 21 in the width direction of the substrate 1) that can be applied by the power supply 32 is not particularly limited. The input power is, for example, 0.5 kW/m or more and 20 kW/m or less. The pretreatment roller 20 may be disposed at an electrical ground level or at an electrically floating level.

(Method for Producing Barrier Film)

A method for producing the barrier film illustrated in FIG. 1 or FIG. 2 using the above-mentioned film-forming apparatus 10 will be described below. First, a method for forming the vapor-deposited film 2 on the surface of the substrate 1 will be described. In the film formation using the film-forming apparatus 10, a plasma pretreatment step and a film-forming step are performed while the substrate 1 is conveyed along the conveying path of the substrate 1 described above. In the plasma pretreatment step, the surface of the substrate 1 is subjected to plasma pretreatment using the plasma pretreatment mechanism 11B. In the film-forming step, a vapor-deposited film is formed on the surface of the substrate 1 using the film formation mechanism 11C. The conveying speed of the substrate 1 is preferably 200 m/min or more, more preferably 400 m/min or more and 1,000 m/min or less.

(Plasma Pretreatment Step)

The plasma pretreatment step is performed, for example, by the following method. A plasma source gas is supplied to the plasma pretreatment compartment 12B. The AC voltage described above is applied across the pretreatment roller 20 and each electrode section 21. When the AC voltage is applied, input power control or impedance control may be performed.

The application of the AC voltage generates plasma simultaneously with glow discharge. This results in an increase in the density of plasma P between the pretreatment roller 20 and the magnetic field generation sections 23. In this way, the plasma P can be supplied between the pretreatment roller 20 and the magnetic field generation sections 23. The surface of the substrate 1 can be subjected to plasma (ion) pretreatment using the plasma P.

In this embodiment, the voltage applied to the pretreatment roller 20 (hereinafter, also referred to as a "drum-applied voltage") is 600 V or more and 800 V or less. The use of a sufficiently high drum-applied voltage can achieve a sufficiently high ratio of the peak intensity $H_1$ of the elemental bond of CN to the maximum value $H_2$ of the elemental bond of Al2O3. In particular, the use of a drum-applied voltage of 600 V or more enables the peak intensity $H_1$ of the peak of the elemental bond of CN to be 0.15 or more times the maximum value $H_2$ of the intensity of the elemental bond of Al2O3. The use of a drum-applied voltage of 800 V or less suppresses browning of the substrate 1 due to an excessively high drum-applied voltage. It is thus possible to inhibit the barrier film from being unsuitable as a product due to its impaired appearance.

The pressure in the plasma pretreatment compartment 12B during the application of the AC voltage across the pretreatment roller 20 and each electrode section 21 is reduced to a pressure lower than or equal to atmospheric pressure by the pressure reduction chamber 12. In this case, the pressure in the plasma pretreatment compartment 12B is adjusted in such a manner that a glow discharge can be generated between the pretreatment roller 20 and the electrode sections 21 by applying the AC voltage, for example. The pressure in the plasma pretreatment compartment 12B during the application of the AC voltage across the pretreatment roller 20 and each electrode section 21 is, for example, 0.05 Pa or more and 8 Pa or less.

The action of the magnetic field generation sections 23 in the plasma pretreatment step will be described. The magnetic field generation sections 23 generate magnetic fields between the pretreatment roller 20 and the electrode sections 21. The magnetic fields can act to capture and accelerate electrons present between the pretreatment roller 20 and the electrode sections 21. Thus, the frequency of collisions between electrons and the plasma source gas can be increased in the region where the magnetic fields are generated. In addition, the density of the plasma can be increased and localized in the region where the magnetic fields are generated. This can improve the efficiency of plasma pretreatment.

(Film-Forming Step)

In the film-forming step, the film is formed on the surface of the substrate 1 using the film formation mechanism 11C. As an example of the film-forming step, the case of forming a vapor-deposited aluminum oxide film using the film formation mechanism 11C including the evaporation mechanism 24 illustrated in FIG. 9 will be described.

The vapor deposition material containing aluminum is supplied into the boat 24b of the evaporation mechanism 24 so as to face the film formation roller 25. As the vapor deposition material, a metal wire rod composed of aluminum can be used. In the example illustrated in FIG. 9, the aluminum metal wire rod is continuously fed into the boat 24b by the vapor deposition material supply section 61. As a result, the vapor deposition material is supplied to the boat 24b.

The aluminum is evaporated in the boat 24b by heating. For convenience, the aluminum vapors 63 of evaporated aluminum are illustrated in FIG. 9.

A method for supplying plasma between the surface of the substrate 1 and the evaporation mechanism 24 by the plasma supply mechanism 50 will be described. In this embodiment, plasma is generated in the cavity of the hollow cathode 51 of the plasma supply mechanism 50. A discharge is then generated between the hollow cathode 51 and the opposing anode. In this way, the plasma in the cavity of the hollow cathode 51 is drawn between the surface of the substrate 1 and the evaporation mechanism 24.

In this embodiment, the electrical discharge generated between the hollow cathode 51 and the opposing anode is an arc discharge. The arc discharge refers to an electrical discharge where the value of a current is, for example, 10 A or more.

Aluminum is evaporated while plasma is supplied between the surface of the substrate 1 and the evaporation mechanism 24, thereby supplying plasma to the aluminum vapor 63. The supply of the plasma can promote the reaction or combination of the aluminum vapor 63 with the oxygen gas. This enables oxidation of the aluminum vapor 63 before the aluminum vapor 63 reaches the surface of the substrate 1. The evaporated and oxidized aluminum adheres to the substrate 1 to form a vapor-deposited aluminum oxide film on the surface of the substrate 1. In this way, the barrier film illustrated in FIG. 1 can be produced.

A gas barrier coating film 3 is formed by a method described below on the surface of the vapor-deposited film 2 of the barrier film, illustrated in FIG. 1, produced by the method described above. Thereby, the barrier film illustrated in FIG. 2 can be produced. First, the metal alkoxide, the silane coupling agent, the hydroxy group-containing water-soluble resin, a reaction promoter (for example, a catalyst, an acid used in a sol-gel method), water serving as a solvent, and an organic solvent, such as an alcohol, e.g., methyl alcohol, ethyl alcohol, or isopropanol, are mixed together. In this way, a gas barrier coating film coating agent composed of a resin composition is prepared.

Then, the above-mentioned gas barrier coating film coating agent is applied to the vapor-deposited film 2 in the usual manner and dried. In this drying step, the condensation or co-condensation reaction further proceeds to form a coating film. The above coating operation may be repeated on the first coating film to form multiple coating films including two or more layers.

Heat treatment is then performed for 3 seconds to 10 minutes. The temperature of the heat treatment is in the range of 20° C. to 200° C., preferably 50° C. to 180° C., and is lower than or equal to the softening point of the resin constituting the substrate 1. In this way, the gas barrier coating film 3 from the above-mentioned gas barrier coating film coating agent is formed on the vapor-deposited film 2. Thereby, the barrier film illustrated in FIG. 2 can be produced.

In this embodiment, the plasma pretreatment step is performed before the film-forming step. In the plasma pretreatment step, plasma is supplied to the surface of the substrate 1. In the plasma pretreatment step, an AC voltage is applied across each electrode section 21 and the pretreatment roller 20. The magnetic field generation sections 23 are used to generate magnetic fields in the space between the electrode sections 21 and the pretreatment roller 20. Each of the magnetic field generation sections 23 is located on a side of a corresponding one of the electrode sections 21 opposite from the side facing the pretreatment roller 20. Thus, the plasma can be efficiently generated in the space between the electrode sections 21 and the pretreatment roller 20. In addition, the plasma can be perpendicularly incident on the surface of the substrate 1 wrapped around the pretreatment roller 20. Accordingly, it is possible to enhance the adhesion between the substrate 1 and the film formed by the film-forming step.

The barrier film having enhanced adhesion as described above is useful for use as a packaging material. Packaging materials are used to produce packaging bags for storing food and other contents. In particular, barrier films that maintain high adhesion even when subjected to heat treatment can be suitably used as materials for packaging bags. When a packaging product is formed using the above-described barrier film as a material, the peeling of the layer included in the barrier film in the packaging product can be suppressed. For example, when a packaging bag produced using the barrier film as a material is subjected to heat sterilization treatment using hot water, it is possible to suppress the peeling of the layer included in the barrier film. In particular, it is possible to suppress peeling of the vapor-deposited film 2 from the substrate 1. The heat sterilization treatment using hot water for packaging bags is, for example, retort treatment or boiling treatment.

The retort treatment is a treatment in which the contents are placed in the packaging bag, the packaging bag is sealed, and then the packaging bag is heated under pressure using steam or heated water. The temperature of the retort treatment is, for example, 120° C. or higher. The boiling treatment is a treatment in which the contents are placed in a package bag, the package bag is sealed, and then the package bag is boiled in hot water under atmospheric pressure. The temperature of the boiling treatment is, for example, 90° C. or higher and 100° C. or lower.

Figure 10:
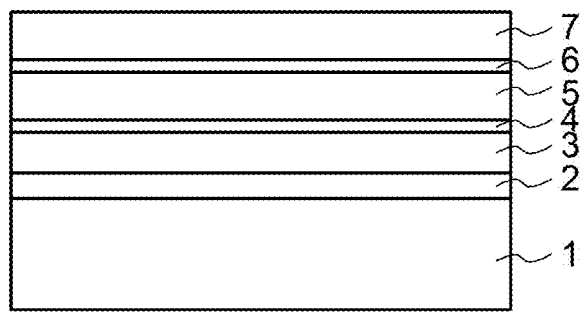
FIG. 10 is a sectional view illustrating an example of a laminate including a barrier film according to an embodiment of the present invention.

An example of a laminate formed by using the barrier film according to the embodiment will be described. FIG. 10 illustrates an example of a laminate 40 formed by using the barrier film according to this embodiment. The laminate 40 includes the barrier film illustrated in FIG. 2 and a sealant layer 7. Specifically, the laminate 40 includes an adhesive layer 4, a second substrate 5, an adhesive layer 6, and a sealant layer 7, in that order, on the gas barrier coating film 3 of the laminate illustrated in FIG. 2.

Figure 11:
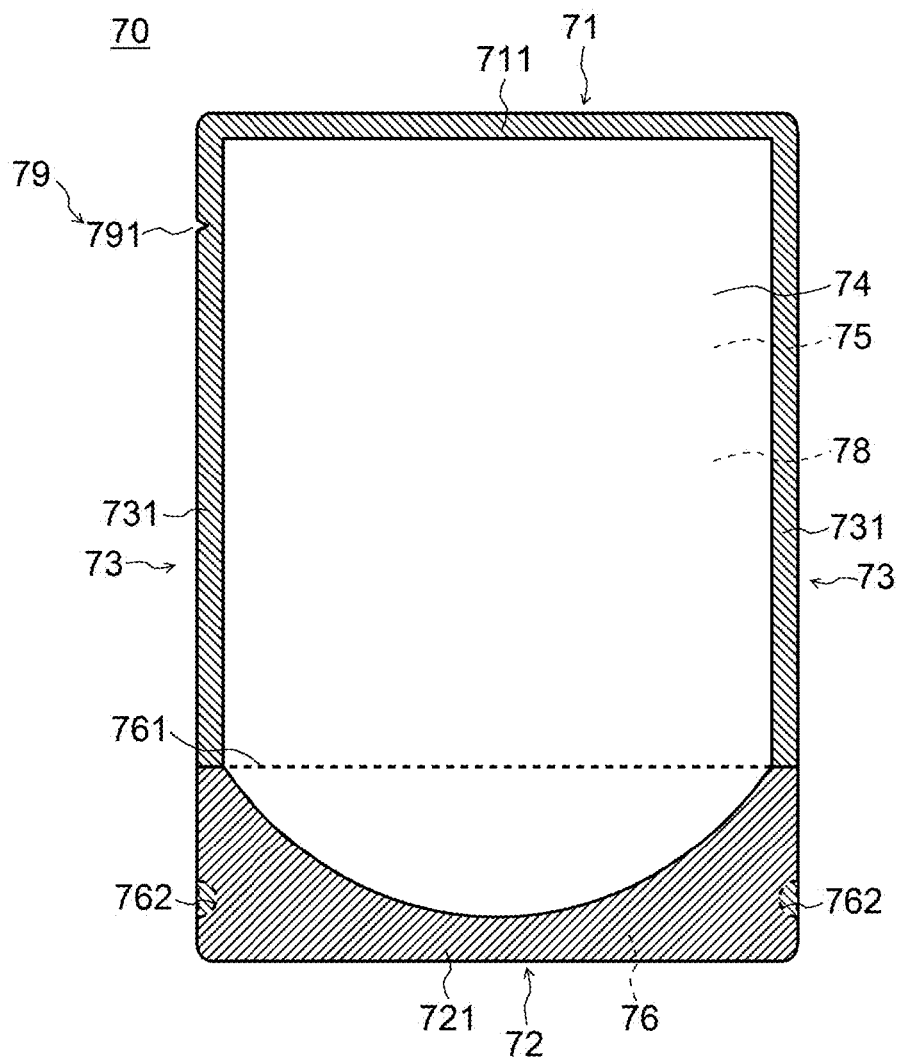
FIG. 11 illustrates an example of a packaging product including a laminate according to an embodiment of the present invention.

As an example of a packaging product formed by using the laminate 40 according to the embodiment, a packaging bag formed by using the laminate 40 will be described with reference to the drawings. FIG. 11 is a schematic front view of an example of a standing pouch according to the embodiment as an example of a packaging bag according to the embodiment. In the standing pouch 70 illustrated in FIG. 11, the bottom section 72 of the pouch 70 is formed so as to have a gusset section. The gusset section is formed of a bottom film 76 (which may be the same or different from a front surface film and a back surface film) inserted between the lower portions of the front surface film 74 and the back surface film 75, which are each formed of the above laminate, up to a folded portion 761. A semi-circular notch 762 is provided near the lower end of each side of the bottom film 76 folded inwardly. The gusset section is formed by heat-sealing a ship bottom-shaped bottom seal section 721 where the inside is concave in a curved line from both sides to the center. The body portion of the pouch is formed by heat-sealing the sides 73 of the front surface film 74 and the back surface film 75 at side seal portions 731. The upper portion 71 of the pouch 70 is heat-sealed at an upper seal portion 711. However, this portion is used as a loading port for contents 78 and thus is an opening portion that is not sealed before the contents 78 is loaded. This portion is heat-sealed after loading the contents 78. In the above example, an example of the standing pouch 70 using three laminates, that is, the front surface film 74, the back surface film 75, and the bottom film 76, has been described. However, the number of the laminates included in the standing pouch 70 is not particularly limited.

In addition, the standing pouch 70 may be provided with easy-open means 79. The easy-open means 79 is used to open the pouch 70 by tearing the front surface film 74 and the back surface film 75. For example, as illustrated in FIG. 11, the easy-open means 79 may include notches 791 formed in the side seal portions 731 that serve as starting points for tearing. A portion of the pouch 70 that serves as a path for tearing the pouch may include a half-cut line formed using laser processing or a cutter as an easy-open means 79.

EXAMPLES

The present invention will be described in more detail by examples. The present invention is not limited to the description of the following examples as long as the scope of the present invention is not exceeded.

Barrier films of Examples 1 to 4 and Comparative examples 1 and 2 were produced using the film-forming apparatus and the film-forming method described in the embodiment.

Example 1

As the substrate 1, a biaxially oriented plastic substrate (available from KOLON Industry Inc., product name "CB981") having a thickness of 12 μm and containing poly(ethylene terephthalate) (PET) as a material was provided. A plasma pretreatment step and a film-forming step were performed using the film-forming apparatus 10 illustrated in FIG. 5.

In the pretreatment step, a surface of the substrate 1 was subjected to plasma pretreatment using the plasma pretreatment mechanism 11B as illustrated in FIGS. 5 and 6.

Specifically, the pressure in the plasma pretreatment compartment 12B was adjusted using the pressure reduction chamber 12 while a mixed gas of argon (Ar) and oxygen ($O_2$) was supplied to the plasma pretreatment compartment 12B using a plasma source gas supply section. The surface of the substrate 1 was subjected to plasma pretreatment by applying a voltage across the pretreatment roller 20 and each electrode section 21 to generate plasma.

In the film-forming step, the vapor-deposited film 2 containing aluminum oxide was formed by a vacuum deposition method using the evaporation mechanism 24 as illustrated in FIG. 9. Specifically, the pressure in the film formation compartment 12C was first adjusted to 1 Pa. The vapor deposition material in the boat 24b was then heated to evaporate the aluminum in such a manner that evaporated aluminum reached the surface of the substrate 1 while a metal wire rod of aluminum serving as the vapor deposition material was supplied into the boat 24b. In this way, the vapor-deposited film 2 was formed on the surface of the substrate 1. The evaporation mechanism 24 of a resistance heating type was used to heat the vapor deposition material in the boat 24b. According to the above method, multiple barrier films each having the substrate 1 and the vapor-deposited film 2 as illustrated in FIG. 1 were produced. The thickness of the vapor-deposited film 2 of each of the resulting barrier films was 13 nm.

The specific conditions of Example 1 are described below.
[Conditions of Plasma Pretreatment Mechanism 11B]
Configuration of plasma pretreatment mechanism 11B: Configuration illustrated in FIGS. 5 and 6.
Plasma source gas supplied to plasma pretreatment compartment 12B: Mixed gas of argon (Ar) and oxygen ($O_2$).
Pressure in plasma pretreatment compartment 12B: 3 Pa.
Magnetic field generation section 23: Permanent magnet with 1,000 G.
[Conditions of Film Formation Mechanism 11C]
Configuration of plasma supply mechanism 50: The configuration includes the hollow cathode 51 illustrated in FIG. 9 and anodes (not illustrated). The anodes are located on both sides in the width direction of the substrate 1 when viewed from the boat 24b, and face the opening of the cavity of the hollow cathode 51.
Method of use of plasma supply mechanism 50: A plasma source gas was supplied to the cavity of the hollow cathode 51 and excited by electrical discharge to produce plasma. This plasma was drawn between the surface of the substrate 1 and the evaporation mechanism 24 using the opposing anodes.

Example 2

The plasma pretreatment step and the film-forming step were performed by the same methods as in Example 1 with the same film-forming apparatus as in Example 1, except that the thickness of the vapor-deposited film 2 was 19 nm. Thereby, multiple barrier films each having the substrate 1 and the vapor-deposited film 2 were produced.

Example 3

Multiple barrier films each having the substrate 1 and the vapor-deposited film 2, as illustrated in FIG. 1, were produced in the same manner as in Example 1. The gas barrier coating film 3 was formed on the vapor-deposited film 2 of each of the barrier films. The gas barrier coating film 3 contains a silicon alkoxide, a poly(vinyl alcohol)-based resin, and a barrier composition prepared by polycondensation using a sol-gel method. The above gas barrier coating film 3 was prepared by a method described below. First, 285 g of tetraethoxysilane was mixed with a solution prepared by mixing 677 g of water, 117 g of isopropyl alcohol, and 16 g of 0.5 N hydrochloric acid (hydrochloric acid with a concentration of 0.5 mol/L), thereby preparing a solution (hereinafter, also referred to as a "solution A". Next, separately from the solution A, 70 g of poly(vinyl alcohol), 1,540 g of water, and 80 g of isopropyl alcohol were mixed to prepare a solution (hereinafter, also referred to as a "solution B"). The solution A and the solution B were mixed in a weight ratio of 13:7 to prepare a solution serving as a barrier coating agent. The resulting barrier coating agent was applied to the surface of each vapor-deposited film 2 and dried at 110° C. for 30 seconds. Thereby, the gas barrier coating film 3 having a thickness of 0.3 μm was formed. In this way, as Example 3, the barrier films each including the substrate 1, the vapor-deposited film 2, and the gas barrier coating film 3 were produced.

Example 4

The plasma pretreatment step and the film-forming step were performed by the same methods as in Example 3 with the same film-forming apparatus as in Example 3, except that the thickness of the vapor-deposited film 2 was 19 nm. Thereby, multiple barrier films each having the substrate 1, the vapor-deposited film 2, and the gas barrier coating film 3 were produced.

Comparative Example 1

A plasma pretreatment mechanism having a dual cathode/target structure, which is commonly used in sputtering and plasma treatment, was used. The glow discharge pretreatment was performed by applying an AC voltage across the dual cathodes using an MF (40 kHz) power supply. No pretreatment by applying a voltage to the pretreatment roller was performed. Except for the above points, film formation was performed in the same manner as in Example 1 with the same film-forming apparatus as in Example 1. Thereby, multiple barrier films each having a substrate and a vapor-deposited film were produced.

Comparative Example 2

The film-forming step was performed in the same manner as in Example 1 with the same film-forming apparatus as in Example 1, except that the film-forming apparatus had no plasma pretreatment mechanism, no plasma pretreatment step was performed, and the thickness of the vapor-deposited film was 10 nm. Thereby, multiple barrier films each having a substrate and a vapor-deposited film were produced.

(Composition Analysis)

Figure 12:
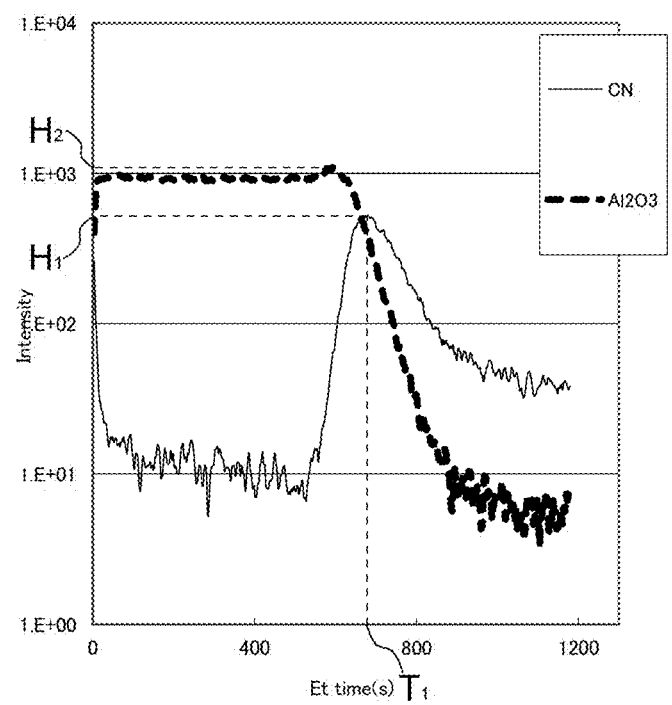
FIG. 12 illustrates an example of a graphical analysis diagram of the results of analyzing a barrier film by time-of-flight secondary ion mass spectrometry in Example 1.
Figure 13:
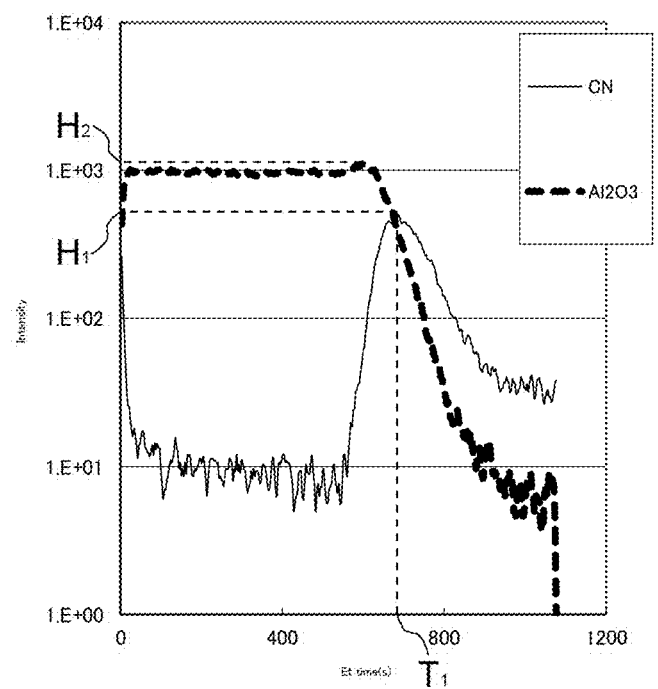
FIG. 13 illustrates an example of a graphical analysis diagram of the results of analyzing a barrier film by time-of-flight secondary ion mass spectrometry in Example 1.
Figure 14:
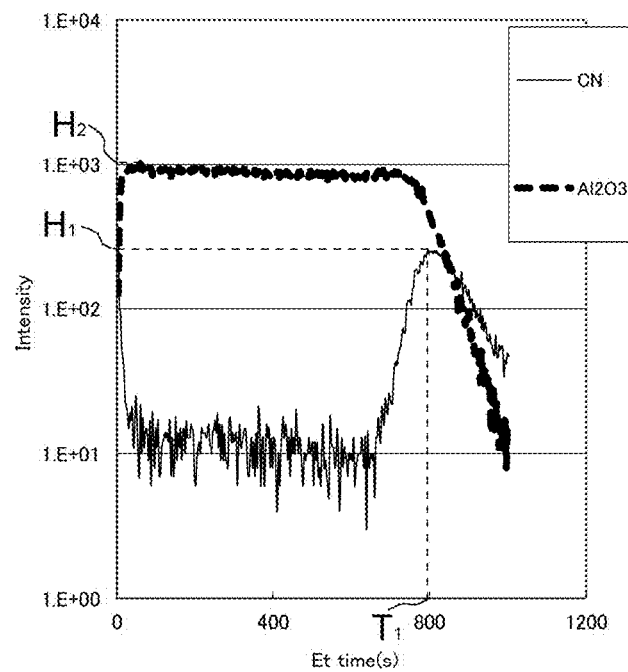
FIG. 14 illustrates an example of a graphical analysis diagram of the results of analyzing a barrier film by time-of-flight secondary ion mass spectrometry in Example 2.
Figure 15:
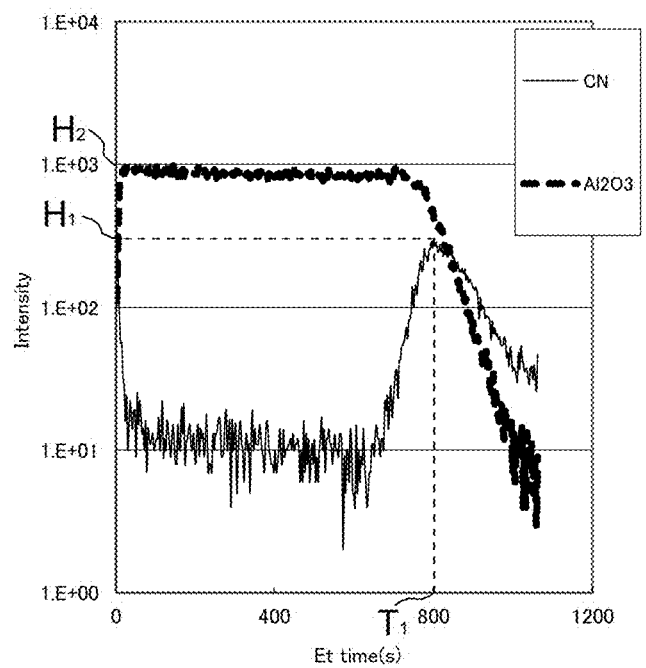
FIG. 15 illustrates an example of a graphical analysis diagram of the results of analyzing a barrier film by time-of-flight secondary ion mass spectrometry in Example 2.
Figure 16:
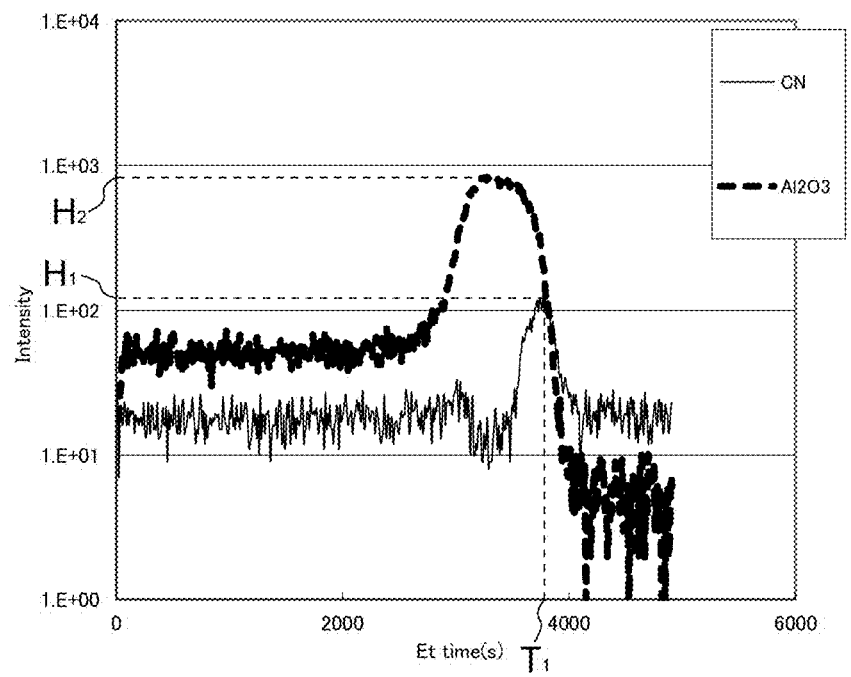
FIG. 16 illustrates an example of a graphical analysis diagram of the results of analyzing a barrier film by time-of-flight secondary ion mass spectrometry in Example 3.
Figure 17:
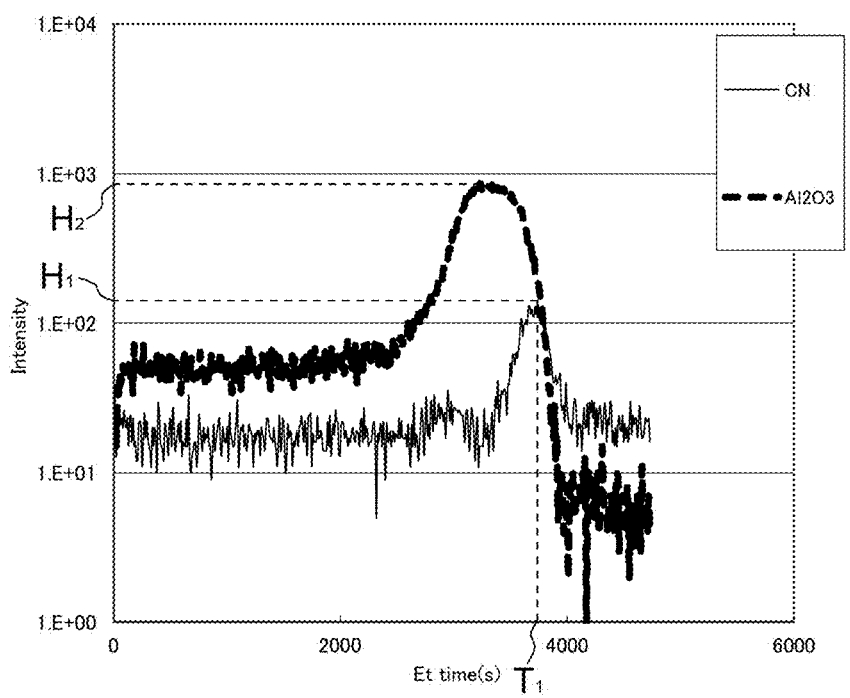
FIG. 17 illustrates an example of a graphical analysis diagram of the results of analyzing a barrier film by time-of-flight secondary ion mass spectrometry in Example 3.
Figure 18:
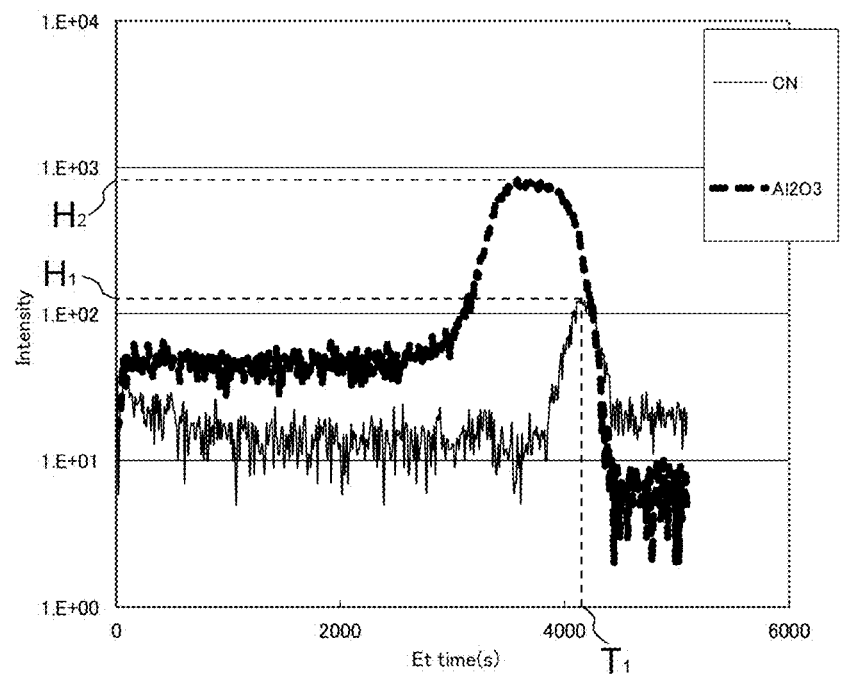
FIG. 18 illustrates an example of a graphical analysis diagram of the results of analyzing a barrier film by time-of-flight secondary ion mass spectrometry in Example 4.
Figure 19:
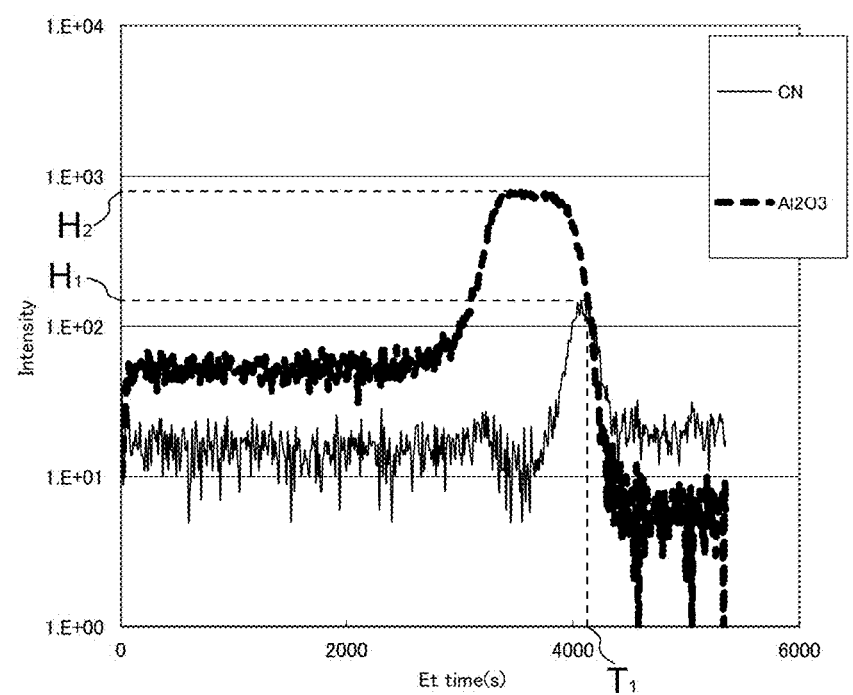
FIG. 19 illustrates an example of a graphical analysis diagram of the results of analyzing a barrier film by time-of-flight secondary ion mass spectrometry in Example 4.
Figure 20:
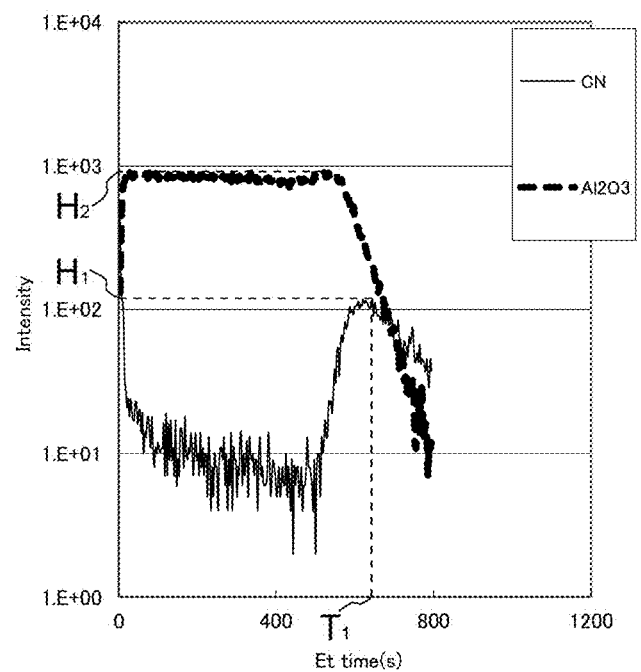
FIG. 20 illustrates an example of a graphical analysis diagram of the results of analyzing a barrier film by time-of-flight secondary ion mass spectrometry in Comparative example 1.
Figure 21:
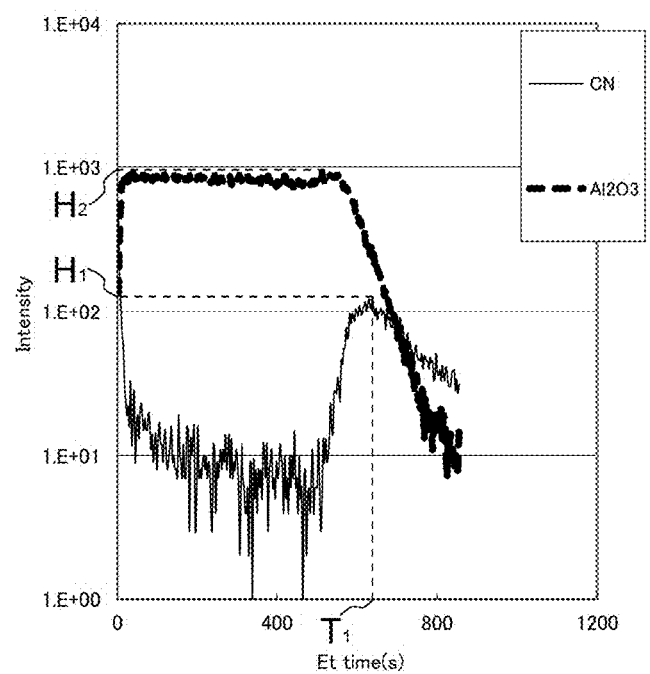
FIG. 21 illustrates an example of a graphical analysis diagram of the results of analyzing a barrier film by time-of-flight secondary ion mass spectrometry in Comparative example 1.
Figure 22:
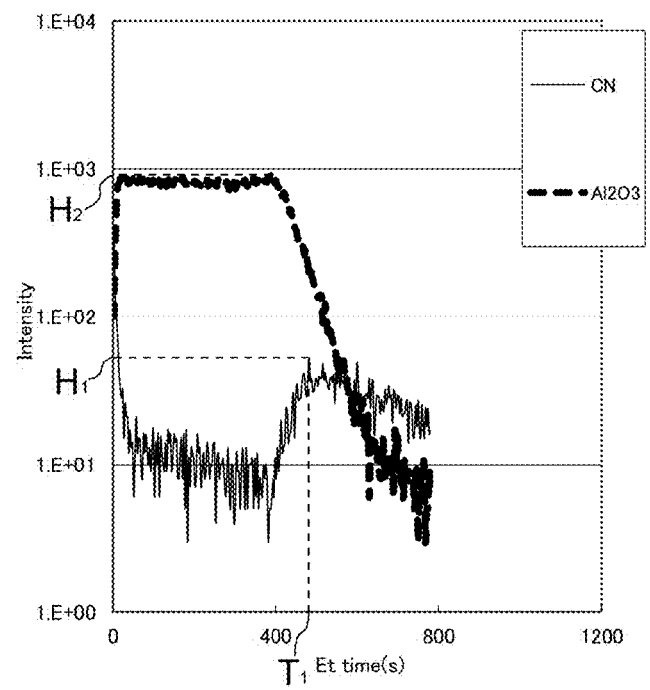
FIG. 22 illustrates an example of a graphical analysis diagram of the results of analyzing a barrier film by time-of-flight secondary ion mass spectrometry in Comparative example 2.
Figure 23:
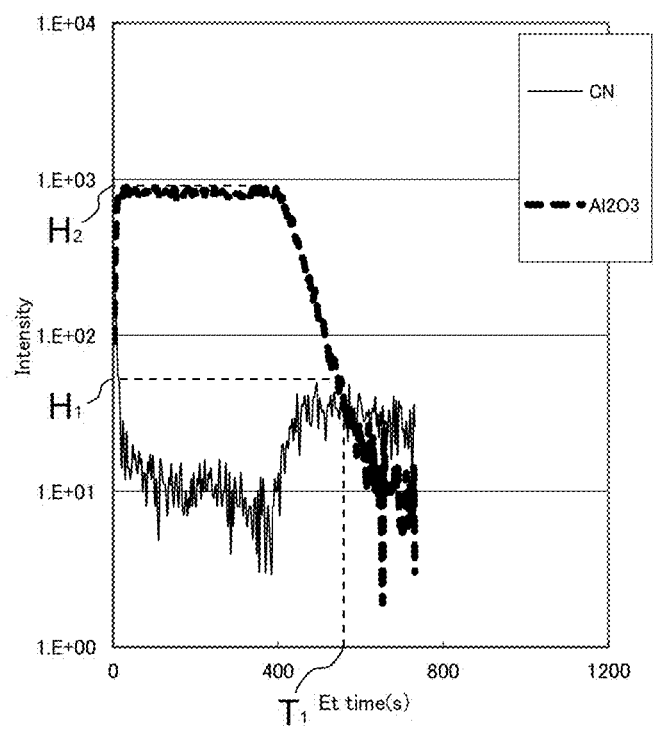
FIG. 23 illustrates an example of a graphical analysis diagram of the results of analyzing a barrier film by time-of-flight secondary ion mass spectrometry in Comparative example 2.

Regarding two barrier films (hereinafter, referred to as "barrier films of sample Nos. n1 and n2) among the multiple barrier films of each of Examples 1 to 4 and Comparative examples 1 and 2 produced by the above methods, the intensities of the elemental bond of CN and the elemental bond of $Al2O3$ in the barrier films were measured using a time-of-flight secondary ion mass spectrometer (available from ION-TOF, product name "TOF. SIMS5". FIG. 12 illustrates the measurement results for one of the multiple barrier films of Example 1 (sample No. n1 of Example 1). FIG. 13 illustrates the measurement results for the other of the multiple barrier films of Example 1 (sample No. n2 of Example 1). FIG. 14 illustrates the measurement results for one of the multiple barrier films of Example 2 (sample No. n1 of Example 2). FIG. 15 illustrates the measurement results for the other of the multiple barrier films of Example 2 (sample No. n2 of Example 2). FIG. 16 illustrates the measurement results for one of the multiple barrier films of Example 3 (sample No. n1 of Example 3). FIG. 17 illustrates the measurement results for the other of the multiple barrier films of Example 3 (sample No. n2 of Example 3). FIG. 18 illustrates the measurement results for one of the multiple barrier films of Example 4 (sample No. n1 of Example 4). FIG. 19 illustrates the measurement results for the other of the multiple barrier films of Example 4 (sample No. n2 of Example 4). FIG. 20 illustrates the measurement results for one of the multiple barrier films of Comparative example 1 (sample No. n1 of Comparative example 1). FIG. 21 illustrates the measurement results for the other of the multiple barrier films of Comparative example 1 (sample No. n2 of Comparative example 1). FIG. 22 illustrates the measurement results for one of the multiple barrier films of Comparative example 2 (sample No. n1 of Comparative example 2). FIG. 23 illustrates the measurement results for the other of the multiple barrier films of Comparative example 2 (sample No. n2 of Comparative example 2). The unit (intensity) on the vertical axis in each of FIGS. 12 to 23 is obtained by taking the common logarithm of the ion intensity. The unit (Et time (s)) on the horizontal axis of each graph is the number of seconds that the etching was performed. The solid line in each of FIGS. 12 to 23 represents the measurement results of the intensity of the elemental bond of CN. The dashed line in each of FIGS. 12 to 23 represents the measurement results of the intensity of the elemental bond of $Al_2O_3$.

In the composition analysis, the etching rate was 3 sec/cycle for the barrier film formed of the substrate 1 and the vapor-deposited film 2, and 10 s/cycle for the barrier film formed of the substrate 1, the vapor-deposited film 2, and the gas barrier coating film 3.

The peak intensity $H_1$ of the peak of the elemental bond of CN and the maximum value $H_2$ of the intensity of the elemental bond of $Al_2O_3$ in the two barrier films (sample Nos. n1 and n2) of each of Examples 1 to 4 and Comparative examples 1 and 2 were determined using the measured intensity of the elemental bond of CN. Then, the peak intensity $H_1$ of the peak of the elemental bond of CN was divided by the maximum value $H_2$ of the intensity of the elemental bond of $Al_2O_3$ to calculate $H_1/H_2$. FIG. 24 presents the calculation results of $H_1/H_2$, along with the values of $H_1$ and $H_2$, the structures of the barrier films, and the thickness of the vapor-deposited films. In FIG. 24, each of the values of $H_1/H_2$ is rounded to the nearest hundredth and is presented to two decimal places. As can be seen from the comparison of Examples 1 to 4 with Comparative examples 1 and 2, when plasma pretreatment was performed using the plasma pretreatment mechanism 11B as illustrated in FIGS. 5 and 6 as in Examples 1 to 4, the value of $H_1/H_2$ was larger than that of the case where the pretreatment in Comparative example 1 was performed. In each of Examples 1 to 4, the value of $H_1/H_2$ was 0.15 or more. In particular, in each of Examples 1 and 2, in which the vapor-deposited films were each located at the surface of the barrier film, the value of $H_1/H_2$ was 0.30 or more. In each of Examples 3 and 4, in which the gas barrier coating films were each disposed on the surface of the vapor-deposited film, the value of $H_1/H_2$ was 0.20 or less.

(Evaluation of Barrier Properties)

The values of water vapor transmission rate and oxygen transmission rate were measured for each of the barrier films of Examples 1 to 4 and Comparative examples 1 and 2 produced by the above methods.

The water vapor transmission rate was measured with a water vapor transmission rate measurement device (available from Mocon, product name "Permatran") in accordance with JIS K 7129 B method under measurement conditions: 40° C., 90% RH. The oxygen transmission rate was measured using an oxygen transmission rate measurement device (available from Mocon, product name "Oxtran") in accordance with JIS K 7126-2 under measurement conditions: 23° C. and 90% RH. FIG. 25 presents the results.

(Evaluation of Adhesion)

The gas barrier coating film 3 was formed in the same manner as that used to form the gas barrier coating film 3 on the vapor-deposited film 2 in Example 3, on the vapor-deposited film 2 of each of the barrier films of Examples 1 and 2 and Comparative examples 1 and 2 produced by the above methods.

Next, an adhesive layer 4 was formed on the surface of the gas barrier coating film 3 of each of the barrier films of Examples 1 and 2 and Comparative examples 1 and 2, in which the gas barrier coating films 3 were formed by the above-mentioned method, and of each of the barrier films of Examples 3 and 4. The adhesive layer 4 was formed by coating the surface of the gas barrier coating film 3 with a two-component curing-type polyurethane-based adhesive for lamination to a thickness of 4.0 $g/m^2$ (dry state) using a gravure roll coating method. A biaxially oriented nylon 6 film having a thickness of 15 μm was laminated as the second substrate 5 on the surface of the adhesive layer 4. The second substrate 5 was laminated on the surface of the adhesive layer 4 by dry lamination with the second substrate 5 facing the surface of the adhesive layer 4. The adhesive layer 6 for lamination was formed on the surface of the second substrate 5 in the same manner as the adhesive layer 4 described above. A non-oriented polypropylene film having a thickness of 70 μm was laminated as the sealant layer 7 on the surface of the adhesive layer 6. The sealant layer 7 was laminated on the surface of the adhesive layer 6 by dry lamination on the surface of the adhesive layer 6. In this way, the laminate having the layer structure illustrated in FIG. 10 was produced.

The laminates having the layer structure as illustrated in FIG. 10 were formed into pouches by heat sealing with the sealant layers facing each other. The pouches were filled with water and then subjected to retort treatment at 135° C. for 40 minutes. The values of water-wet peel strength of each of the laminates in the state after the retort treatment were measured.

The water-wet peel strength was measured by a method described below. The laminates each having the layer structure as illustrated in FIG. 10 were produced using the barrier films of Examples 1 to 4 and Comparative examples 1 and 2, formed into pouches, and subjected to retort treatment, and then cut into rectangles. In this way, rectangular test pieces 15 mm wide were produced. Next, the vapor-deposited film and the substrate of each of the test pieces were partially peeled off in the longitudinal direction of the test piece (the direction perpendicular to the width direction of the test piece). The peeling of the vapor-deposited film and the substrate was performed in such a manner that the bonding between the vapor-deposited film and the substrate was partially maintained. Next, the peeling strength of the interface between the vapor-deposited film and the substrate was measured in accordance with JIS Z6854-2 using a Tensilon universal material testing machine at a peeling angle of 180° and a peeling speed of 50 mm/min. For the measurement of the water-wet peel strength, water was first dropped with a dropper on the boundary between a portion where the vapor-deposited film and the substrate maintained their bonding and a portion where the vapor-deposited film and the substrate were peeled off, when observed in the longitudinal direction of the test piece. The tensile forces required for the peeling to proceed by 30 mm were measured while the boundary was wetted with water, and the average value of the tensile forces was calculated. For each of Examples 1 to 4 and Comparative examples 1 and 2, the average value of the tensile forces for five test pieces was calculated. The resulting average value was defined as the water-wet peel strength in each of Examples 1 to 4 and Comparative examples 1 and 2.

FIG. 25 presents the evaluation results of the water vapor transmission rates, oxygen transmission rates, and water-wet peel strength of the barrier films of Examples 1 to 4 and Comparative Examples 1 and 2. In FIG. 25, the expression "<0.1" in the oxygen transmission rate column indicates that the oxygen transmission rate was measured to be at least less than 0.1 $cm^3/(m^2\text{-day})$. In FIG. 25, the expression ">2.0" in the water-wet peel strength column indicates that the water-wet peel strength was measured to be at least greater than 2.0 N/15 mm.

A comparison of Examples 1 to 4 with Comparative examples 1 and 2 indicated that laminates of Examples 1 to 4 had greater water-wet peel strength than the laminates of Comparative examples 1 and 2. The reason for this is presumably that the barrier films according to the present invention, in which the peak intensity $H_1$ of the peak of the elemental bond of CN is 0.15 or more times the maximum value $H_2$ of the intensity of the elemental bond of Al2O3, have greatly improved adhesion, compared with the barrier films of Comparative Examples 1 and 2.

Both the water vapor transmission rate and the oxygen transmission rate of the barrier films of Examples 1 to 4 were lower than those of the barrier films of Comparative examples 1 and 2. This indicated that the barrier films of Examples 1 to 4 had superior barrier properties to the barrier films of Comparative examples 1 and 2.

In Example 1, the drum-applied voltage in the plasma pretreatment step was 720 V.

To study the relationship between the characteristics of the barrier film and the drum-applied voltage, barrier films according to Example 5, Comparative example 3, and Reference examples 1 to 3 were produced.

Example 5

The plasma pretreatment step and the film-forming step were performed by the same methods as in Example 1 with the same film-forming apparatus as in Example 1, except that the thickness of the vapor-deposited film was 9 nm and the drum-applied voltage was 600 V. Thereby, multiple barrier films each having the substrate 1 and the vapor-deposited film 2 were produced.

Comparative Example 3

The plasma pretreatment step and the film-forming step were performed by the same methods as in Example 1 with the same film-forming apparatus as in Example 1, except that the drum-applied voltage was 472 V. Thereby, multiple barrier films each having the substrate 1 and the vapor-deposited film 2 were produced.

Reference Example 1

The plasma pretreatment step and the film-forming step were performed by the same methods as in Example 1 with the same film-forming apparatus as in Example 1, except that the drum-applied voltage was 530 V. Thereby, multiple barrier films each having the substrate 1 and the vapor-deposited film 2 were produced.

Reference Example 2

The plasma pretreatment step and the film-forming step were performed by the same methods as in Example 1 with the same film-forming apparatus as in Example 1, except that the drum-applied voltage was 662 V. Thereby, multiple barrier films each having the substrate 1 and the vapor-deposited film 2 were produced.

Reference Example 3

The plasma pretreatment step and the film-forming step were performed by the same methods as in Example 1 with the same film-forming apparatus as in Example 1, except that the drum-applied voltage was 895 V. Thereby, multiple barrier films each having the substrate 1 and the vapor-deposited film 2 were produced.

$H_1/H_2$ was calculated for two barrier films (hereinafter, also referred to as "barrier films of sample Nos. n1 and n2) among the barrier films of Example 5 produced by the above method, and for the barrier films of Comparative example 4 produced by the above method. $H_1/H_2$ was calculated in the same manner as for the barrier films of Examples 1 to 4 and Comparative Examples 1 and 2. FIG. 26 presents the calculation results of $H_1/H_2$ for the barrier films of sample Nos. n1 and n2 in Example 5 and the barrier films of Comparative example 4, along with the calculation results in Example 1. In FIG. 26, each of the values of $H_1/H_2$ is rounded to the nearest hundredth and is presented to two decimal places.

As can be seen from the comparison of Examples 1 and 5 with Comparative example 3, $H_1/H_2$ was larger in Examples 1 and 5 where the drum-applied voltage was larger than that in Comparative example 3. In particular, when the drum-applied voltage was 600 V or higher as in Examples 1 and 5, $H_1/H_2$ was 0.15 or more times.

The values of the oxygen transmission rates and the water-wet peel strength were measured for each of the barrier films of Example 5, Comparative example 3, and Reference examples 1 to 3. The values of the oxygen transmission rates and the water-wet peel strength were measured by the same methods as for the barrier films of Examples 1 to 4 and Comparative examples 1 and 2. In addition, an evaluation was made as to whether the substrates discolored after the plasma pretreatment step. FIG. 26 presents the evaluation results of the oxygen transmission rates, water-wet peel strength, and discoloration of the substrates of the barrier films of Example 5, Comparative example 3, and Reference examples 1 to 3, along with the evaluation results in Example 1.

From the evaluation results, it was found that the water-wet peel strength was larger and the oxygen transmission rates were lower in Examples 1 and 5 and Reference example 2, where the drum-applied voltage was 600 V or more and 800 V or less, compared with Comparative example 3 and Reference example 1, where the drum-applied voltage was less than 600 V. In particular, the water-wet peel strength was greater than 2.0 N/15 mm when the drum-applied voltage was 600 V or more and 800 V or less, as in Examples 1 and 5 and Reference example 2. When the drum-applied voltage was 600 V or more and 800 V or less, the oxygen transmission rate was found to be 0.8 cm$^3$/(m$^2$-day) or less. This may be due to the fact that when the drum-applied voltage is 600 V or more and 800 V or less, $H_1/H_2$ is 0.15 or more times as in Examples 1 and 5, thus resulting in higher water-wet peel strength and a lower oxygen transmission rate.

In Reference example 3, where the drum-applied voltage was greater than 800 V, the substrate turned brown and was inappropriate as a product. In contrast, when the drum-applied voltage was 600 V or more and 800 V or less, as in Examples 1 and 5 and Reference example 2, no discoloration of the substrate occurred. When the drum-applied voltage was 600 V or more and 800 V or less, high water-wet peel strength and a low oxygen transmission rate were obtained, compared with the case where the drum-applied voltage was greater than 800 V.

REFERENCE SIGNS LIST 1 substrate
2 vapor-deposited film
3 gas barrier coating film
4 adhesive layer
5 second substrate
6 adhesive layer
7 sealant layer
10 film-forming apparatus
P plasma
X rotation axis
11A substrate-conveying mechanism
11B plasma pretreatment mechanism
11C film formation mechanism
12 pressure reduction chamber
12A substrate-conveying compartment
12B plasma pretreatment compartment
12C film formation compartment
13 unwinding roller
14a to d guide roll
15 winding roller
20 pretreatment roller
21 electrode section
23 magnetic field generation section
23a first surface
23b second surface
231 first magnet
231c first axial portion
232 second magnet
232c second axial portion
232d connecting portion
24 evaporation mechanism
24b boat
25 film formation roller
31 power supply wiring
32 power supply
35a to 35c partition
50 plasma supply mechanism
51 hollow cathode
61 vapor deposition material supply section
63 aluminum vapor

The invention claimed is:

1. A barrier film, consisting of a substrate consisting of poly(ethylene terephthalate), a vapor-deposited film consisting of aluminum oxide, and optionally a gas barrier coating film located on a surface of the vapor-deposited film,
wherein the substrate has a pretreated surface that is plasma-pretreated by generating a glow discharge between a pretreatment roller around which the substrate is wrapped and that conveys the substrate and an electrode section that includes a first surface that faces the pretreatment roller and is flat, by applying an AC voltage of 600 V or more and 800 V or less,
the vapor-deposited film is formed on the pretreated surface,
the vapor-deposited film has a thickness of 3 nm or more and 100 nm or less, and
when at least an elemental bond of $Al_2O_3$ and an elemental bond of CN are detected by etching the barrier film using time-of-flight secondary ion mass spectrometry from a side adjacent to the vapor-deposited film,
a peak intensity of a peak of the elemental bond of CN detected at an interface between the substrate and the vapor-deposited film is 0.15 or more times a maximum intensity value of the elemental bond of $Al_2O_3$.

2. The barrier film according to claim 1, further comprising the gas barrier coating film located on a surface of the vapor-deposited film.

3. The barrier film according to claim 2, wherein the peak intensity of the peak of the elemental bond of CN detected at the interface between the substrate and the vapor-deposited film is 0.20 or less times the maximum intensity value of the elemental bond of $Al_2O_3$.

4. The barrier film according to claim 1, wherein the vapor-deposited film is located at a surface of the barrier film, and
the peak intensity of the peak of the elemental bond of CN detected at the interface between the substrate and the vapor-deposited film is 0.30 or more times the maximum intensity value of the elemental bond of $Al_2O_3$.

5. A laminate, comprising the barrier film according to claim 1 and a sealant layer.

6. A packaging product, comprising the laminate according to claim 5.

7. A packaging product according to claim 6, wherein the barrier film further comprises a gas barrier coating film located on a surface of the vapor-deposited film.

8. A packaging product according to claim 7, wherein the peak intensity of the peak of the elemental bond of CN detected at the interface between the substrate and the vapor-deposited film is 0.20 or less times the maximum intensity value of the elemental bond of $Al_2O_3$.

9. A packaging product according to claim 6, wherein the vapor-deposited film is located at a surface of the barrier film, and
the peak intensity of the peak of the elemental bond of CN detected at the interface between the substrate and the vapor-deposited film is 0.30 or more times the maximum intensity value of the elemental bond of $Al_2O_3$.

10. A laminate according to claim 5, wherein the barrier film further comprises a gas barrier coating film located on a surface of the vapor-deposited film.

11. A laminate according to claim 10, wherein the peak intensity of the peak of the elemental bond of CN detected at the interface between the substrate and the vapor-deposited film is 0.20 or less times the maximum intensity value of the elemental bond of $Al_2O_3$.

12. A laminate according to claim 5, wherein the vapor-deposited film is located at a surface of the barrier film, and
the peak intensity of the peak of the elemental bond of CN detected at the interface between the substrate and the vapor-deposited film is 0.30 or more times the maximum intensity value of the elemental bond of $Al_2O_3$.

* * * * *